(12) United States Patent
Braedt et al.

(10) Patent No.: US 10,900,547 B2
(45) Date of Patent: Jan. 26, 2021

(54) DRIVE ARRANGEMENT FOR A BICYCLE AND TOOL

(71) Applicant: SRAM Deutschland GmbH, Schweinfurt (DE)

(72) Inventors: Henrik Braedt, Hambach (DE); Matthias Reinbold, Würzburg (DE); Robert Boehm, Mainberg (DE); Sebastian Reineke, Schweinfurt (DE); Luis Miguel Mendes Figueiredo, Antanhol (PT)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 194 days.

(21) Appl. No.: 15/437,177

(22) Filed: Feb. 20, 2017

(65) Prior Publication Data

US 2017/0217539 A1     Aug. 3, 2017

Related U.S. Application Data

(63) Continuation-in-part of application No. 15/085,570, filed on Mar. 30, 2016, now Pat. No. 10,053,186.

(30) Foreign Application Priority Data

Mar. 30, 2015   (DE) ........................ 10 2015 205 736
Feb. 19, 2016   (DE) .................... 20 2016 001 048 U

(51) Int. Cl.
*B62M 9/1242*   (2010.01)
*F16H 9/24*   (2006.01)
*B62M 9/10*   (2006.01)
*F16H 55/30*   (2006.01)
*B25B 27/00*   (2006.01)
*B62M 9/121*   (2010.01)

(52) U.S. Cl.
CPC ........... *F16H 9/24* (2013.01); *B25B 27/0071* (2013.01); *B62M 9/10* (2013.01); *B62M 9/121* (2013.01); *F16H 55/30* (2013.01); *F16H 2009/245* (2013.01)

(58) Field of Classification Search
CPC .......... B62M 9/10; B62M 9/12; B62M 9/121; B62M 9/124; B62M 9/126; F16H 55/30; F16H 9/24; F16H 2009/245
See application file for complete search history.

(56) References Cited

U.S. PATENT DOCUMENTS

| | | |
|---|---|---|
| 3,748,916 A | 7/1973 | Morse |
| 4,268,259 A | 5/1981 | Segawa et al. |
| (Continued) | | |

FOREIGN PATENT DOCUMENTS

| | | |
|---|---|---|
| AU | 2011201317 A1 | 10/2012 |
| DE | 3810974 A1 | 12/1988 |
| (Continued) | | |

*Primary Examiner* — Michael R Mansen
*Assistant Examiner* — Robert T Reese

(57) ABSTRACT

A drive arrangement for a bicycle may include a plurality of sprockets arranged at a rear wheel of the bicycle. The sprockets may be particularly arranged to have a spacing that facilitates the configuration of an increasing number of sprockets in the plurality of sprockets. A singular front sprocket or chainring may be used to drive the rear plurality of sprockets. A particularly configured tool may be used to configure the drive arrangement.

19 Claims, 14 Drawing Sheets

(56) References Cited

U.S. PATENT DOCUMENTS

| | | |
|---|---|---|
| 5,954,604 A | 9/1999 | Nakamura |
| 6,264,575 B1 | 7/2001 | Lim |
| 6,340,338 B1 | 1/2002 | Kamada |
| 8,834,309 B2 | 9/2014 | Braedt |
| 8,911,314 B2 | 12/2014 | Braedt |
| 9,272,750 B2 * | 3/2016 | Bohm ............... B62M 9/126 |
| 2001/0041641 A1 | 11/2001 | Mercat et al. |
| 2006/0128511 A1 | 6/2006 | Oishi |
| 2008/0064545 A1 * | 3/2008 | Yamaguchi ........ B62M 9/126 474/82 |
| 2009/0042680 A1 | 2/2009 | Valle |
| 2011/0105263 A1 | 5/2011 | Braedt |
| 2012/0208662 A1 * | 8/2012 | Braedt ................ B62M 9/10 474/160 |
| 2012/0309572 A1 * | 12/2012 | Braedt ................ B62M 9/10 474/160 |
| 2014/0128191 A1 | 5/2014 | Boehm |
| 2015/0243019 A1 | 8/2015 | Hall |
| 2016/0167737 A1 | 6/2016 | Tokuyama et al. |
| 2018/0186429 A1 * | 7/2018 | Nakamura ............ B62M 9/124 |

FOREIGN PATENT DOCUMENTS

| | | | |
|---|---|---|---|
| DE | 19629602 A1 | 1/1998 | |
| DE | 202012006903 U1 | 8/2012 | |
| DE | 102012204452 A1 | 9/2013 | |
| DE | 102014018568.0 | 12/2014 | |
| EP | 1074462 A2 * | 1/2000 | ............. B62M 9/10 |
| EP | 1043221 A2 | 10/2000 | |
| EP | 1188658 A2 | 3/2002 | |
| EP | 1609716 A2 | 12/2005 | |
| EP | 1671880 A2 | 6/2006 | |
| EP | 2022712 A2 | 3/2009 | |
| EP | 2048075 A2 | 4/2009 | |
| EP | 3385153 A1 * | 10/2018 | ............. B62M 9/10 |
| GB | 2171474 A | 8/1986 | |

* cited by examiner

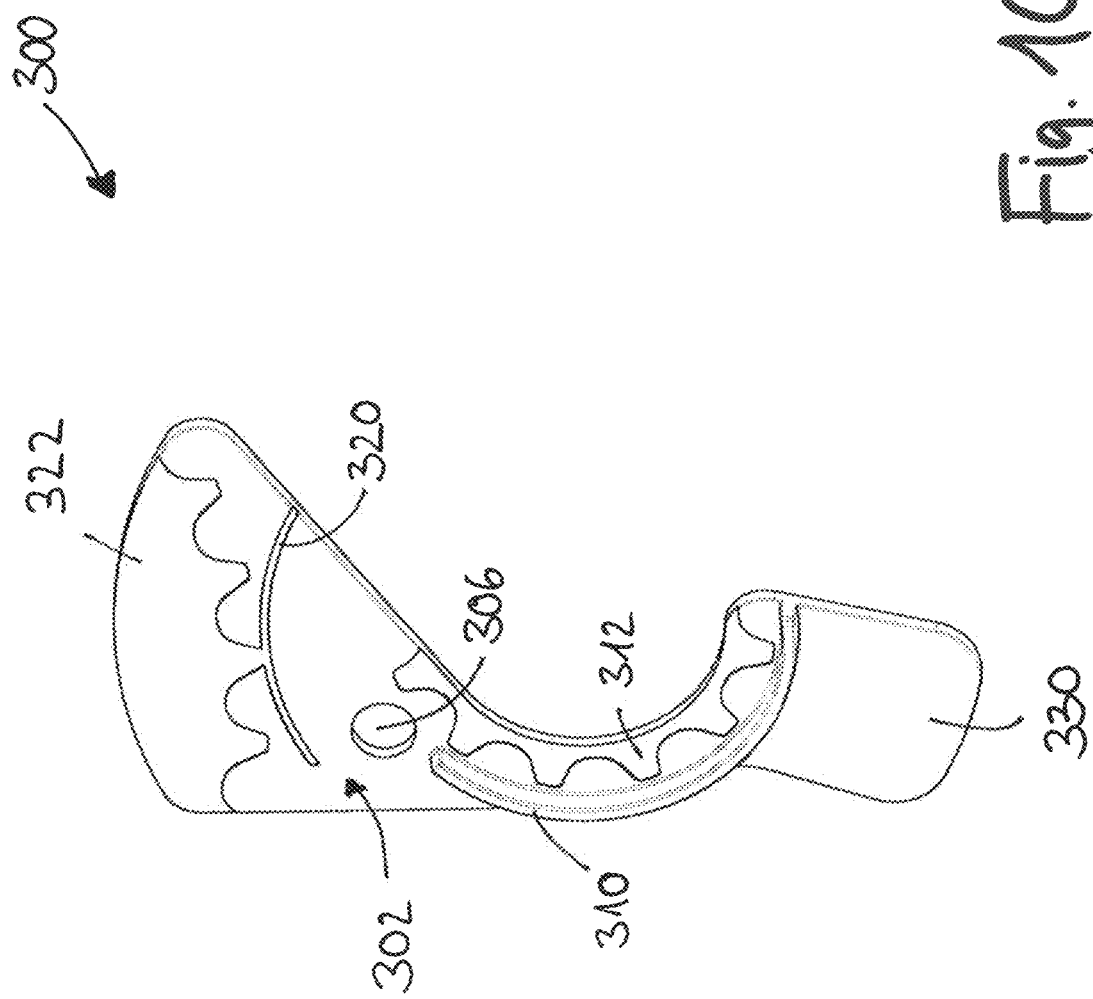

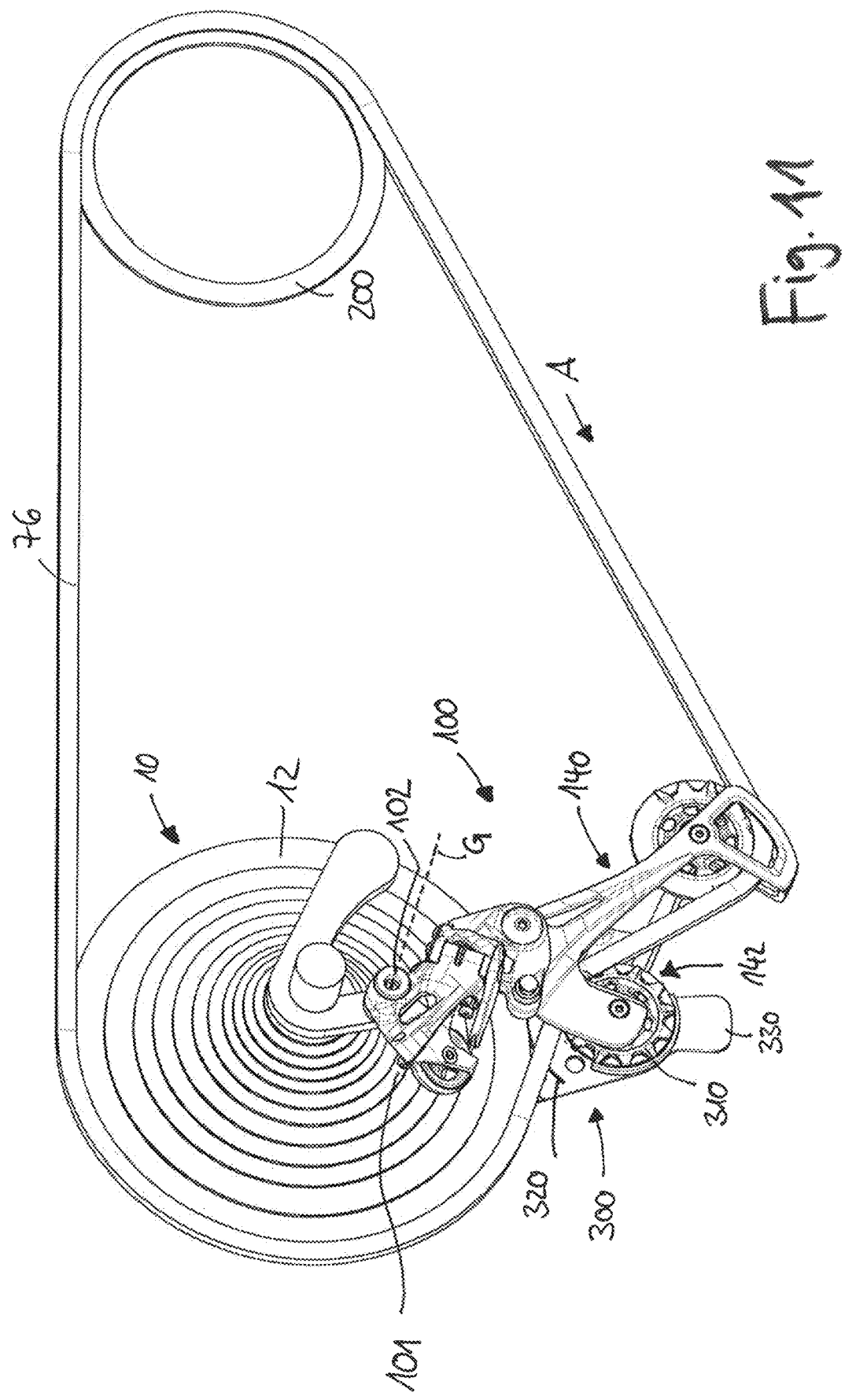

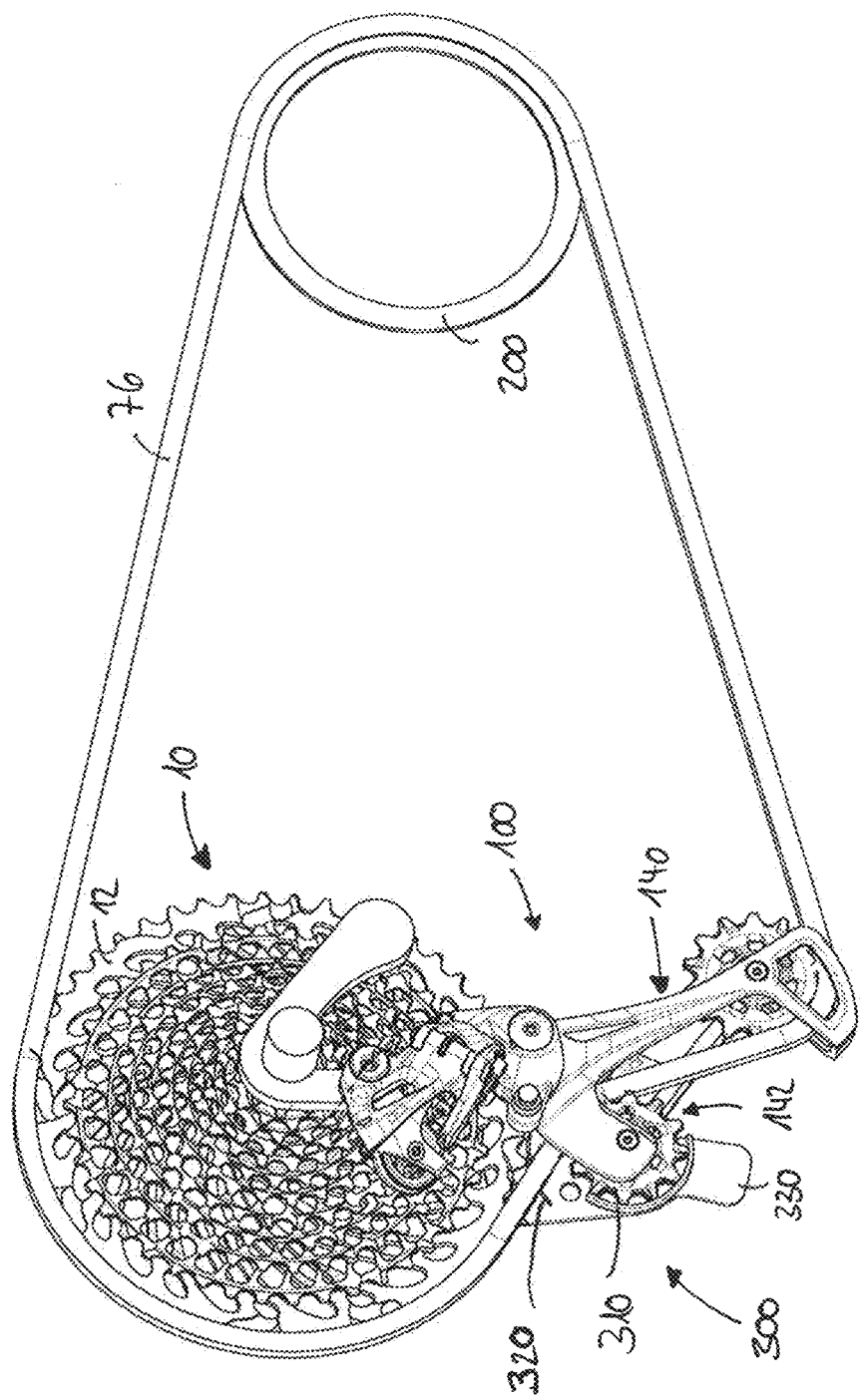

DRIVE ARRANGEMENT FOR A BICYCLE AND TOOL

This application claims priority to, and/or the benefit of, German patent application DE 20 2016 001 048.5, filed on Feb. 19, 2016, and this application is a Continuation in Part of U.S. patent application Ser. No. 15/085,570, filed Mar. 30, 2016, which claims priority to, and/or the benefit of, German patent application DE 10 2015 205 736.4, filed on Mar. 30, 2015, the disclosure of which are all included by reference herein in their entirety.

FIELD OF THE INVENTION

The invention generally relates to a bicycle drivetrains, and specifically to a bicycle drivetrain having a multiple sprocket cassette, at least one front chainring, a chain connecting the cassette and the at least one chainring, as well as at least one gear changing device configured to move the chain among the multiple sprockets of the cassette.

BACKGROUND

Bicycle rear wheel sprocket arrangements are generally known. They are used in touring bicycle, racing bicycle, and mountain bike sectors where derailleur mechanism gears are provided in bicycles in order to bring about different transmission ratios from the pedal crank to the rear wheel. In this instance, the number of sprockets on the rear wheel has always increased over time in order to graduate transmission ratios more and more finely. This fineness of the graduation was even further supported by an increasing number of chain rings on the pedal crank.

Recently, there has been a development tendency which reduces the number of chain rings which are directly connected to the pedal crank. This may lead to the so-called one-fold derailleur mechanisms in which only a single chain ring is provided on the pedal crank. With the reduction in the number of chain rings, the number of sprockets in the rear wheel sprocket arrangement and the tooth number graduation thereof assumes increasing importance for producing desired transmission ratios.

Reference may be made to the publication U.S. Pat. No. 3,748,916 A of Morse by way of example of a bicycle rear wheel sprocket arrangement of the generic type for a one-fold derailleur mechanism. This publication discloses a bicycle rear wheel sprocket arrangement with a total of 5 sprockets, of which the smallest may have 9 and the largest may have 45 teeth. Consequently, that sprocket arrangement has a gear range quotient of 45:9=5. Consequently, the gear range quotient is a measurement for the bandwidth of transmission ratios which can be produced with a sprocket arrangement. The greater the value of the gear range quotient, the greater is the bandwidth of transmission ratios which can be produced.

The technically most advanced prior art in the field of one-fold derailleur mechanisms may currently be a system which is marketed by SRAM under the name "XX1". This system with a rear wheel sprocket arrangement comprising 11 sprockets has a gear range quotient of 4.2.

Furthermore, the XX1 system comprises a rear derailleur. The derailleur is coordinated in its geometry to the cassette and ensures that the chain tension in all transmission ratios corresponds to the requirements. The geometry (angle and length) of the cage and the tensioning device are particularly of importance for this purpose and have to be adapted to the number and size of the sprockets.

The known derailleur of the XX1 system can furthermore be set by means of a set screw (B screw) so as to be pivotable about the joint head axis with respect to the bicycle frame. The derailleur can therefore be adapted to the size of the cassette. By means of the set screw, the derailleur pivots about the joint head axis in order to set a predefined distance between the upper or sprocket-closer shift roller and that tooth of the largest sprocket which is closest to the shift roller. In other words, a distance between the outside diameter of the upper shift roller and the outside diameter of the largest sprocket, which distance is specific to and is predetermined for the components of the drive arrangement, is set. Said distance, the free chain length between the upper shift roller and an active sprocket may also be mentioned, should always be approximately identical in size in order to maintain friction-free shifting. The drive arrangement is described in DE 10 2012 204 452 A1.

Shift systems are also known, the derailleur of which is pre-tensioned in relation to the frame by means of a spring in the joint head and in which the distance between shift roller and sprocket is adapted by changing the spring setting.

Specifically bicycle rear wheel sprocket arrangements with a high number of sprockets and/or a great difference in number of teeth between the largest and the smallest sprocket require a precise setting of the predefined distance. The greater the axial and/or radial extent of the rear sprocket arrangement, the greater is the path of movement of the derailleur. Reliable and friction-free shifting for the entire rear sprocket arrangement can be ensured only with a precise setting.

To date, the setting of the predefined distance has been possible only imprecisely by counting the free chain links (free chain length) between the upper shift roller and the active sprocket. This disadvantage of the defective and complicated setting of the drive arrangement is overcome by another aspect of the invention, a setting aid device or apparatus according to an embodiment and the simple use thereof.

Reference is further made as additional prior art to EP 2 022 712 A of Campagnolo, which discloses a 12-fold sprocket arrangement whose smallest sprocket has 11 teeth and whose largest sprocket has 27 teeth. The gear range quotient of that sprocket arrangement is, at 2.45, slightly less than half as large as that of the sprocket arrangement of the previously discussed US patent.

Reference may be made to U.S. Pat. No. 5,954,604 A of Shimano as another extreme example of a multiple sprocket arrangement which sets out a sprocket arrangement having 14 sprockets. FIG. 13 of this publication shows an embodiment in which the smallest sprocket of the sprocket arrangement has 11 teeth and the largest sprocket has 39 teeth. Therefore, the gear range quotient of that known sprocket arrangement is 3.54.

In a more comprehensible manner, the number of sprockets in the sprocket arrangement gives a measurement of the fineness of the graduation of the transmission ratios which can be achieved with a rear wheel sprocket arrangement. The higher the number of sprockets, the finer the graduation of the adjustable transmission ratios can be.

However, there may be only limited structural space available for the arrangement of the rear wheel sprocket arrangement on a rear wheel hub so that the number of sprockets in the sprocket arrangement cannot be freely increased. Therefore, the packing density quotient mentioned in the introduction directly gives a measurement of how effectively the structural space present on the rear wheel hub is used for the arrangement of sprockets. Indirectly, the packing density quotient is also a measurement concerning the fineness of the graduation of the achievable transmission ratios because it contains in the numerator information concerning the number of sprockets in the rear wheel sprocket arrangement. Again, the following applies: the higher the packing density quotient, the more effective is the use of structural space for the arrangement of sprockets. The packing density quotient is, similar to the gear range quotient, a dimensionless numerical value, for the establishment of which only the numerical value of the spacing measured in millimetres between the axially outermost sprockets should be used.

The 5-fold sprocket arrangement known from U.S. Pat. No. 3,748,916 A takes up, for example, an axial structural space of approximately 26 millimetres. Consequently, the packing density quotient purely as a numerical value variable of this sprocket arrangement is 0.192.

In comparison, EP 2 022 712 A for the 12-fold sprocket in the most advantageous disclosed case, the implementation of which is not demonstrated in the publication, however, sets out an axial structural space requirement of 40.5 millimetres. This results in a packing density quotient of 0.296.

The above-mentioned 1-fold derailleur system XX1 of the same Applicant has, with 11 sprockets in a structural space of 38.4 millimetres, a packing density quotient of 0.286.

Finally, reference may be made as an additional comparison to the above-mentioned U.S. Pat. No. 5,954,604 A in which 14 sprockets of a sprocket arrangement are received with an axial spacing of the outermost sprockets which axially measures approximately 50 millimetres, which results in a packing density quotient of approximately 0.28.

Evidently, modern rear wheel sprocket arrangements have a packing density quotient of slightly below 0.3. This sets out the current state of axial structural space use on rear wheel hubs. The overview set out above of different existing rear wheel sprocket arrangements shows that either existing sprocket arrangements offer a large bandwidth of transmission ratios, but they are then graduated in a relatively coarse manner and distributed over a relatively large axial structural space, or existing sprocket arrangements offer a very fine graduation of relatively narrow bandwidths of transmission ratios, but then with very effective use of the axial structural space available.

The existing sprocket arrangements for bicycle rear wheels no longer comply in each case with the increasing demands placed on them. In view of the most recent technical trends in the development of bicycle components as described in the introduction, it is no longer sufficient to graduate bandwidth of transmission ratios only in a very coarse manner or to offer only a small bandwidth of transmission ratios. In particular, but not only, in the case of a one-fold derailleur mechanism having only one chain ring, a large bandwidth of transmission ratios which is graduated in a relatively fine manner and which has space in conventional bicycle constructions is required on the rear wheel. For this purpose, a new class of bicycle rear wheel sprocket arrangements is required.

Given the background of this prior art, it is the object of the present invention to provide a drivetrain device or component for a bicycle as is described herein.

SUMMARY AND DESCRIPTION

In an embodiment, a bicycle rear wheel sprocket arrangement which can be rotated about a sprocket rotation axis. The bicycle rear wheel sprocket arrangement comprises a plurality of sprockets which are coaxial with respect to the sprocket rotation axis. The sprockets are arranged with axial spacing from each other and have different numbers of teeth which are constructed for positive-locking engagement with a bicycle chain. The sprocket arrangement has a gear range quotient which is formed by division of the number of teeth of the sprocket having the largest diameter by the number of teeth of the sprocket having the smallest diameter, and has a packing density quotient which is formed by division of the number of sprockets in the sprocket arrangement by the axial spacing measured in millimeters of the axially outermost sprockets from each other.

In an embodiment a drive arrangement includes a bicycle rear wheel multiple sprocket arrangement as described herein, a chain ring, a chain and a rear derailleur designed for the bicycle rear wheel sprocket arrangement.

In an embodiment a setting aid and/or tool for such a drive arrangement and the use of said setting aid is provided.

BRIEF DESCRIPTION OF THE DRAWINGS

The present invention is explained in greater detail below with reference to the appended drawings, in which:

FIGS. 10a-10d are a plurality of views of a setting aid;

FIG. 11 is a setting aid positioned on a drive arrangement;

FIG. 12 is a setting aid positioned on a drive arrangement; and

DETAILED DESCRIPTION OF THE DRAWINGS

Figure 1:
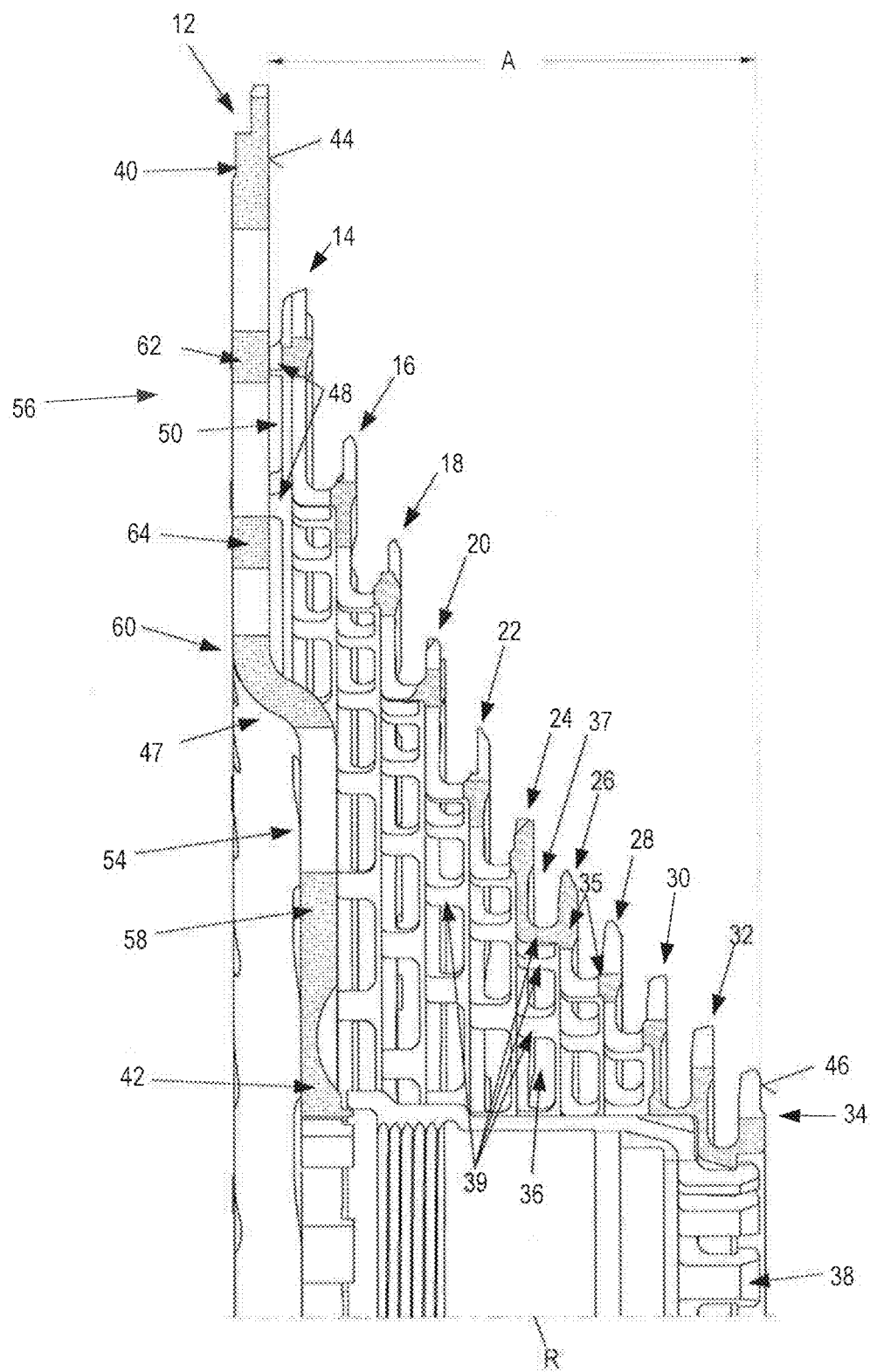
FIG. 1 is a longitudinal sectioned view of an embodiment of a bicycle rear wheel sprocket arrangement in a plane of section which contains the sprocket rotation axis.

Geometry of rear wheel multiple sprocket cassettes may be characterized using a packing density quotient. In the establishment or determination of the packing density quotient, the important aspect is the manner in which the axial spacing of the axially outermost sprockets from each other is established, that is to say, generally of the sprocket having the largest diameter and the sprocket having the smallest diameter from each other. In principle, it is possible to use the sprocket center planes which are orthogonal to the sprocket rotation axis as reference planes for establishing the spacing.

Since, for the production of switching operations in the rear wheel sprocket arrangement, the positioning of the derailleurs relative to the rear wheel sprockets is orientated with respect to the front faces of the individual sprockets, which front faces are directed away from the bicycle longitudinal center plane in the assembled state, however, the axial front faces of the individual sprockets may be used as reference faces for establishing the spacing. In this instance, the front face should be used at the sprocket having the largest diameter at the side which the next-smallest sprocket is opposite. At the sprocket having the smallest diameter, there should be used the front face which is directed away from the sprocket having the largest diameter. If a sprocket is provided with an angled portion at the rear wheel hub for reasons of the most effective use possible of the structural space provided for the fitting thereof, the front face portion nearest the tooth ring of the sprocket should be decisive. Therefore, the spacing of the axially outermost sprockets from each other is preferably the axial spacing of the front faces of those sprockets from each other.

In the case of doubt there should be determined as the front face the face or face portion of a sprocket with which the sprocket at the relevant side is positioned on a planar substrate. If the sprocket has individual teeth which project axially beyond the front face—for instance, acting as switching support teeth—those teeth should not be taken into consideration when the front face is established. Such exceptional teeth which project axially beyond the front face are known, for example, from EP 1 671 880 A.

As indicated above, a new class of bicycle rear wheel sprocket arrangements is required. An embodiment of the present invention meets these requirements on modern bicycle rear wheel sprocket arrangements by providing a bicycle rear wheel sprocket arrangement of the type mentioned in the introduction which has a gear range packing coefficient which is greater than 1.25.

In this instance, the gear range packing coefficient is the product of the gear range quotient and packing density quotients already discussed above. The gear range packing coefficient is a measurement for which bandwidth of transmission ratios is provided, with which graduation for which use of the axial structural space on the rear wheel hub. The higher the gear range packing coefficient is, the greater the bandwidth of transmission ratios and also the finer the graduation of this bandwidth and the less axial structural space is required for producing the sprocket arrangement.

By way of comparison, the gear range packing coefficient of the sprocket arrangement known from U.S. Pat. No. 3,748,916 A is approximately 0.96. The gear range packing coefficient of the 12-fold sprocket arrangement known from EP 2 022 712 A is approximately 0.72. The gear range packing coefficient of the rear wheel sprocket arrangement which is known from U.S. Pat. No. 5,954,604 A, which has 14 sprockets, is approximately 0.991.

The gear range packing coefficient of the XX1 system is 1.20.

With a new class of rear wheel sprocket arrangements, in which the gear range packing coefficient is greater than 1.25, it is possible to provide on rear wheel sprocket arrangements large bandwidths of transmission ratios with a large number of sprockets in a small axial structural space in a manner graduated relatively finely. Therefore, the gear range packing coefficient of a sprocket arrangement may be even greater than 1.3, or even greater than 1.35, in an embodiment. It is easy to see that, with increasing values of the coefficient discussed here, the ride comfort provided by the relevant sprocket arrangements also increases with regard to transmission ratio bandwidth and graduation so that, in conjunction with tests carried out by the Applicant, sprocket arrangements having a gear range packing coefficient greater than 1.4 are particularly advantageous is some embodiments. As set out below with reference to an embodiment, a gear range packing coefficient of 1.48 is provided.

With the rear wheel sprocket arrangements with gear range packing coefficients greater than 1.25, the prerequisite of reducing the chain loads is further met, that is to say, more precisely chain tensile loads, which occur during operation of a bicycle provided with the rear wheel sprocket arrangement. Advantageous effects are connected with the reduction of the chain tensile loads, such as a reduction of the friction which acts within the bicycle chain or also between the bicycle chain and an engagement element (e.g. a sprocket or chain ring) and the wear which occurs on the bicycle chain and an engagement element. Furthermore, a reduction of the maximum chain tensile load brings about a reduction of the deformation of the bicycle frame during operation as a result of chain tensile loads which change periodically with the turning of the pedal crank.

This is because rear wheel sprocket arrangements with gear range packing coefficients greater than 1.25 are primarily achieved by using sprockets having the largest diameter with very high numbers of teeth so that the load arm of those sprockets having the largest diameter is greater than the load arm of comparable sprockets of existing and known sprocket arrangements. For the same torque introduced into the rear running wheel, a smaller force, that is to say, a smaller chain load, is required for the larger load arm.

Rear wheel sprockets having a larger diameter allow the use of chain rings having a larger diameter, without the transmission ratio of the pedal cranks in relation to the rear wheel being made worse. Quite the reverse: as a result of a sub-proportional increase of the diameter also of the chain ring—in comparison, for instance, with existing one-fold derailleur systems—in relation to the increase of the diameter of the sprocket having the largest diameter, not only can the chain load occurring during operation be reduced but at the same time the bandwidth of the torque transmission from the pedal cranks to the rear wheel can be increased.

With increasing values of the gear range packing coefficient, structural problems with respect to the sprocket arrangements may have to be solved, which will be discussed in greater detail below. For example, the sprocket having the largest diameter may take up diameters at which the load applied to the sprocket by the bicycle chain results in a noteworthy flexural loading of the sprocket. This applies to an even greater extent if the bicycle chain running on the sprocket having the largest diameter may have a given oblique position relative to the bicycle longitudinal center plane because the sprocket having the largest diameter is an axially outermost sprocket of the sprocket arrangement.

Similarly, an approach of the bicycle chain towards the next-largest sprocket up to abrasive contact of the chain with this sprocket may have to be overcome on the sprocket having the smallest diameter, again as a result of the oblique position of the bicycle chain running on the sprocket which has the smallest diameter. Such problems may arise, but are to be avoided.

In order to provide the most adequate bandwidth possible of transmission ratios in the bicycle rear wheel sprocket arrangement, it is advantageous if the gear range quotient of the sprocket arrangement is greater than or equal to 4.2. The greater the gear range quotient, the greater the transmission ratio range provided by the sprocket arrangement. Therefore, in an embodiment, the gear range quotient may be greater than or equal to 4.5.

In order to avoid difficulties resulting from the construction of the sprocket arrangement during operation, such as, for example, those mentioned above, it is advantageous if the gear range quotient does not exceed the value 6. Difficulties during operation of the sprocket arrangement can be avoided with even greater probability if the gear range quotient is not greater than 5.5.

The best possible use of the structural space available for receiving the sprocket of the sprocket arrangement can be achieved if the packing density quotient of the sprocket arrangement has a value greater than or equal to 0.286. For the reasons mentioned, in an embodiment this value may be greater than or equal to 0.290.

In conjunction with the construction of the sprocket arrangement as described by the packing density quotient, difficulties during operation of the sprocket arrangement can also occur in the case of excessively high values of the packing density quotient, such as, for example, an undesirable contact of the bicycle chain which meshes with a sprocket with an adjacent sprocket, for instance because they have been moved axially together to an excessive extent. In order to avoid such difficulties during operation, the packing density quotient should advantageously not be greater than 0.36, wherein the probability of avoiding operating difficulties is even greater at a packing density quotient which does not exceed 0.33.

In order to be able to provide the most advantageous possible torque transmission from the pedal crank to the rear running wheel in order to overcome gradients, the sprocket having the largest diameter of the sprocket arrangement should not have fewer than 45 teeth, taking into consideration a specific necessary minimum size of the front chain ring. Greater gradients can be overcome with a sprocket having the largest diameter with not fewer than 48 teeth. In the field of mountain bikes, a sprocket having the largest diameter with not fewer than 50 teeth may be advantageous in order to overcome the challenges encountered by the cyclist.

Concerns in hill climbing applications at the axial longitudinal end of the sprocket arrangement, which end is nearer the sprocket having the largest diameter, are concerns in fast riding applications at the opposite axial longitudinal end at which the sprocket having the smallest diameter is located. In order to be able to provide transmission ratios which are adequate in this case in cooperation with the at least one chain ring on the pedal crank, it is advantageously provided that the sprocket having the smallest diameter does not have more than 12 teeth. Higher travel speeds as a result of an even greater transmission of the muscle power into speed can be achieved by a sprocket having the smallest diameter with no more than 11 teeth. In an embodiment, the sprocket having the smallest diameter has no more than ten ("10") teeth in order to be able to achieve even extraordinarily high peak speeds.

In addition to the bandwidth of transmission ratios, the graduation of the bandwidth which is provided in total by the rear wheel sprocket arrangement is of interest. In view of the above-described great bandwidth—expressed by the gear range quotient—the rear wheel sprocket arrangement discussed in this instance should offer at least eight ("8") additional stages on the basis of an axially outermost sprocket so that the rear wheel sprocket arrangement has more than eight ("8") sprockets. The fineness of the graduation also increases with an increasing number of sprockets so that the rear wheel sprocket arrangement discussed in this instance has more than ten ("10") sprockets, and has even more than eleven ("11") sprockets in an embodiment.

According to an embodiment, the percentage change of the number of teeth does not exceed 20% from one sprocket to the next-largest sprocket of the rear wheel sprocket arrangement, always in relation to the smaller of the two sprockets being considered. In this instance, it is advantageous if the two largest percentage changes in the number of teeth are brought about at the transition from the sprocket having the smallest diameter to the next-largest sprocket and at the transition from the second-largest sprocket to the sprocket having the largest diameter. Advantageously, the greatest percentage increase in the number of teeth occurs at the transition from the sprocket having the smallest diameter to the next-largest sprocket. The second-largest percentage change of the number of teeth may then be at the transition from the second-largest sprocket to the sprocket having the largest diameter. In order to achieve the most uniform possible graduation of the achievable transmission ratios in the sprocket range between the sprocket having the smallest diameter and the sprocket having the largest diameter, it may further be advantageous if the percentage changes in the number of teeth between two adjacent sprockets of that sprocket group are not less than 12% and not more than 17%. The value of the percentage change of the number of teeth from one sprocket to the next-largest sprocket can repeatedly decrease initially and then increase again from the sprocket having the smallest diameter to the sprocket having the largest diameter.

In the above-discussed peripheral conditions for the sprocket having the largest diameter, the sprocket may reach a relatively large mass and, in a manner connected therewith, a relatively great weight. Since the sprockets are part of the bicycle mass which is intended to be accelerated and slowed, however, a sprocket having the largest diameter with the smallest possible mass is desired. In order to ensure that the muscle power introduced by the cyclist at the pedal crank can be transmitted to the rear running wheel in a reliable and durable manner, the sprocket having the largest diameter may have at the radially outer side a tooth ring region for transmitting force from the bicycle chain to the sprocket. Similarly, the sprocket having the largest diameter may have at the radially inner side a hub region which is used to transmit torque from the sprocket to a rear wheel hub, at which the rear wheel sprocket arrangement is received. In order to reduce the mass being moved, it is then advantageous if there are provided a plurality of sprocket spokes radially between the tooth ring region and the hub region for the connection of those regions in a manner transmitting torque.

The sprocket having the largest diameter can then advantageously be provided with the smallest possible mass with dimensional stability which is adequate for operation if the sprocket having the largest diameter has an outer spoke region which is located radially further outwards and has an inner spoke region which is located radially further inwards, wherein the outer spoke region has a greater number of sprocket spokes than the inner spoke region. In this instance, for example, the sprocket spokes can be constructed in the inner spoke region so as to have approximately the same cross-sectional area as the sprocket spokes in the outer spoke region.

In order to support the different number of sprocket spokes in the outer and inner spoke region, an intermediate ring region which is solid in the peripheral direction can be constructed between the outer and inner spoke region in an embodiment. The radially outer ends of the sprocket spokes of the inner spoke region and the radially inner ends of the sprocket spokes of the outer spoke region can be supported on that solid intermediate ring region.

Advantageously, the above-mentioned tooth ring region is also constructed to be solid, that is to say, without interruptions which cut out material on and/or between the teeth of the tooth ring region in order to provide the most uniform conditions possible in a peripheral direction for the torque transmission from the bicycle chain to the sprocket arrangement. For the same reasons of the most uniform torque transmission possible from the sprocket arrangement to a rear wheel hub, the above-mentioned hub region may also be constructed in a solid manner.

In order to be able to provide, between the tooth ring regions of the axially outermost sprockets which are decisive for the switching operation at the rear wheel sprocket arrangement, a greater axial spacing than at the rear wheel hub itself for fitting the sprockets, at least the sprocket having the largest diameter may be constructed to have an angled portion. To this end, the sprocket having the largest diameter may be angled in such a manner that the tooth ring thereof has a greater axial spacing from the sprocket having the smallest diameter than an angled sprocket region of the sprocket having the largest diameter, which sprocket region is located radially further inwards. For reasons of stability, this angled portion may be constructed in the radial portion of the solid intermediate ring region. At least the angled portion can overlap with the intermediate ring region in a radial direction. However, the angled portion may be located completely in the intermediate ring region.

Furthermore, the flexural stability of the sprocket having the largest diameter can be increased by such an angled portion with respect to bending about a bending axis which is orthogonal to the rotation axis of the sprocket.

The solid intermediate ring region may be constructed to be circular at least in a radial portion, that is to say, there exists a solid radial portion of the intermediate ring region which has the same radial spacing from the sprocket rotation axis at each point in a peripheral direction.

In order to reinforce the sprocket having the largest diameter, there may further be provision for every second sprocket spoke acting as a connection spoke with respect to the sprocket spoke thereof which is directly adjacent in a predetermined rotation direction to be connected by a connection strut which is located radially between the longitudinal ends of the sprocket spokes in the outer spoke region at least in a peripheral portion, or over the entire periphery. Consequently, pairs of sprocket spokes can be connected to each other by the connection strut. That connection strut can be used to connect the sprocket having the largest diameter to the next-smallest sprocket which is axially directly adjacent. Therefore, there may be provision for the arrangement of the at least one connection strut radially in a region which is radially overlapped by the axially adjacent, next-smallest sprocket in order to provide on the axially directly adjacent, next-smallest sprocket sufficient material for producing a physical connection with respect to the connection strut on the sprocket having the largest diameter without impairing the engagement of the bicycle chain with this sprocket as a result of the physical connection.

It has surprisingly been found that it is sufficient both for the advantageous additional reinforcement of the sprocket which has the largest diameter and for an adequate physical connection of the sprocket having the largest diameter with respect to the axially adjacent, next-smallest sprocket, if only every second sprocket spoke is constructed as a connection spoke in the manner mentioned above. In order to obtain the lowest possible total weight of the sprocket having the largest diameter, therefore, such a connection strut may not to be provided between the connection spoke and the sprocket spoke thereof which is adjacent in the rotation direction opposite the predetermined rotation direction.

In an embodiment a plurality of connection struts, a majority of connection struts, and/or all the connection struts are spaced apart from the sprocket rotation axis to the same extent.

As indicated above, the sprocket having the largest diameter can be physically connected to the next-smallest sprocket in the region of the connection struts. The connection struts proposed to this end can be located on the sprocket having the largest diameter radially in a very external position, for instance, radially slightly inside the tooth ring of the axially adjacent, next-smallest sprocket. The connection struts may be arranged in the radially outermost third of the sprocket having the largest diameter. The total radial extent of the sprocket having the largest diameter is measured in this instance from the sprocket rotation axis to the radially outermost tooth tip even if the sprocket centrally has a recess.

The construction of the connection mentioned makes the operation of the sprocket having the largest diameter considerably easier because that physical connection of the sprocket having the largest diameter to the axially adjacent, next-smallest sprocket on the connection struts increases the flexural rigidity of the sprocket having the largest diameter in the event of loading with bending about a bending axis orthogonal to the sprocket rotation axis.

In structural terms, the physical connection of the connection struts to the next-smallest sprocket can be brought about by connectors which extend between a connection strut and the next-smallest sprocket so as to bridge the axial gap which exists between the sprocket having the largest diameter and the next-smallest sprocket. The connectors are connected so as to transmit torque both to the connection strut and to the next-smallest sprocket. In order to increase the rigidity and dimensional stability of the bicycle rear wheel sprocket arrangement overall, the connectors may be connected so as to also transmit axial force both to the connection strut and to the next-smallest sprocket.

For the most effective possible transmission of torque from pedal cranks to the sprocket having the largest diameter, the sprocket having the largest diameter may be constructed in such a manner that for at least one sprocket spoke, all the sprocket spokes of a spoke region, and/or all the sprocket spokes of the sprocket having the largest diameter, it is the case that the radially inner longitudinal end thereof leads the radially outer longitudinal end of the same sprocket spoke in a drive rotation direction of the sprocket arrangement.

In order to prevent undesirable shearing stress peaks and for the most uniform possible load distribution in the at least one sprocket spoke during the torque transmission, the at least one sprocket spoke may be constructed to be curved about a curvature axis parallel with the sprocket rotation axis so that it is curved in a concave manner when viewed in a drive rotation direction and in a convex manner when viewed counter to the drive rotation direction. The sprocket spokes of a spoke region of the sprocket having the largest diameter may be constructed to be substantially identical—with the exception of the above-mentioned connection spokes which are connected by a connection web to the sprocket spoke directly adjacent in a rotation direction.

In order to increase the stability, in particular dimensional stability, of the sprocket arrangement, there may be provision for the sprocket which is axially directly adjacent to the sprocket having the largest diameter to be constructed separately from the sprocket having the largest diameter but integrally with the axially adjacent sprocket at the side thereof directed away from the sprocket having the largest diameter. The sprocket which is axially directly adjacent to the sprocket having the largest diameter may be constructed integrally with a plurality of sprockets which are arranged at the side thereof directed away from the sprocket having the largest diameter.

In very general terms, it may be the case that two axially adjacent sprockets, in particular the sprocket having the largest diameter and the sprocket which is axially directly adjacent thereto, are constructed separately from each other and are connected so as to transmit torque and/or transmit axial force by a plurality of connectors which bridge the axial gap existing between the adjacent sprockets. The connectors may be constructed as separate connectors separately from each of the two axially directly adjacent sprockets and may have been connected to each of those sprockets. Alternatively or additionally, some or all connectors may be constructed integrally with one of the two axially directly adjacent sprockets and may have been connected to the other sprocket.

A particularly solid and stable sprocket arrangement can be obtained in that at least two axially directly adjacent sprockets, in particular a sprocket smaller than the sprocket having the largest diameter and the sprocket which is axially directly adjacent thereto, are constructed integrally with each other and are connected so as to transmit torque and/or transmit axial force by a plurality of connectors in the form of webs which bridge the axial gap existing between the adjacent sprockets. In this case, the webs may be constructed as connection means in an integral, materially cohesive manner with respect to each of the two axially directly adjacent sprockets. The webs may be formed, for example, by cutting methods, in particular by milling, from the piece of material forming the sprockets.

In an advantageous manner, the sprocket arrangement can be formed in an even more stable manner the further the connectors are arranged radially outwards. The prerequisite for an arrangement of the connectors in a position which is as radially externally as possible can be achieved in that the connectors are connected to the smaller of the two axially adjacent sprockets in a peripheral direction at a location at which a tooth is located on the smaller of the two axially adjacent sprockets. Since the tooth projects radially further than an intermediate tooth space region of the tooth ring of the same sprocket, the material contributing to the tooth, for example, a portion of the tooth base, can be used to connect the connectors to the smaller of the two adjacent sprockets, independently of whether the connectors is constructed integrally or separately with respect to the smaller of the two sprockets.

If the torque transmission from the bicycle chain to the rear running wheel is always carried out via the sprocket having the largest diameter, the connectors—irrespective of whether they are constructed separately from the sprockets which they connect or integrally therewith—can be constructed to be particularly thin if the longitudinal end thereof which is located nearer the sprocket having the larger diameter leads the opposite longitudinal end, which is located nearer the axially directly adjacent sprocket in the sprocket having the smaller diameter, in the drive rotation direction of the sprocket arrangement.

The previously described construction of the sprocket having the largest diameter in the sprocket arrangement is so advantageous that the Applicant reserves the right to apply for separate protection for a bicycle rear wheel sprocket arrangement which is rotatable about a sprocket rotation axis and which has a plurality of sprockets which are coaxial with respect to the sprocket rotation axis and which are arranged with axial spacing from each other and which have different numbers of teeth which are constructed for positive-locking engagement with a bicycle chain. For implementing the advantages of the sprocket having the largest diameter mentioned in those claims, the important aspect is not the implementation of the gear range packing coefficient mentioned in the introduction. Conversely, the use of the sprocket described which has the largest diameter makes it easier to implement a bicycle rear wheel sprocket arrangement with the values mentioned for the gear range packing coefficient. Therefore, an embodiment of the present invention also relates to a bicycle rear wheel sprocket arrangement which can be rotated about a sprocket rotation axis and which has a plurality of sprockets which are coaxial with respect to the sprocket rotation axis and which are arranged with axial spacing from each other and which have different numbers of teeth which are constructed for positive-locking engagement with a bicycle chain.

An embodiment of the present invention further relates to a bicycle rear wheel drive arrangement having a bicycle rear wheel sprocket arrangement which is constructed as described above and having a bicycle chain.

As already indicated above, there may be produced undesirable effects at the sprocket having the smallest diameter as a result of the oblique position of the chain such as, for example, rubbing of the chain on the axially adjacent, next-largest sprocket. In this instance, the axial guiding of the chain and therefore the limitation of the chain movement in an axial direction on the sprocket having the smallest diameter is of particular interest. That axial guiding of the chain on the sprocket having the smallest diameter can be improved and therefore the axial movability of the chain on the sprocket can be limited in that the tooth ring at least of the sprocket having the smallest diameter of the bicycle rear wheel sprocket arrangement is constructed so as to have an axial sprocket thickness which changes over a periphery in a peripheral direction between teeth and intermediate tooth spaces which are directly adjacent thereto. Consequently, there can be constructed on the sprocket axially thicker regions which then axially guide the bicycle chain when the bicycle chain meshes with the sprocket having the smallest diameter. In the axially thinner regions of the sprocket, however, there may be provided axial play between the bicycle chain and sprocket portions in order to keep friction effects which act between the bicycle chain and the sprocket small. Since the bicycle chain has a periodic structure in the longitudinal chain direction, the variable axial sprocket thickness may also be constructed to be periodically variable.

In order to allow an introduction of the sprocket teeth with as little loss as possible in intermediate spaces of the bicycle chain provided for this purpose and a withdrawal of the sprocket teeth out of those intermediate spaces in a similarly loss-free manner, the axial thickness of the sprocket in the region of the intermediate tooth spaces is advantageously greater than in the region of the teeth. The sprocket constructed in this manner axially guides the bicycle chain advantageously only in the region of the intermediate tooth spaces while the teeth of the sprocket in the force-transmitting engagement with the bicycle chain between plate pairs of the bicycle chain are used only for force transmission between the rollers of the bicycle chain and the sprocket.

The bicycle chain may be a roller chain which is known per se and which has a plurality of rollers which are arranged in an equidistant manner in the longitudinal chain direction with parallel roller rotation axes, which rollers are connected to each other alternately via pairs of parallel inner plates and outer plates, wherein each inner plate is arranged between the roller and an outer plate in the region of a roller connected thereto in the direction of the roller rotation axis.

In such a bicycle chain, it is already advantageous for reasons of weight for both the outer plates and the inner plates to have a smaller height in a longitudinal center portion than in the longitudinal end portions thereof.

An arrangement of the above-mentioned connectors in order to connect two axially directly adjacent sprockets can be carried out advantageously in a position which is radially as far outwards as possible if the connectors are connected radially in a position so far outwards with the two axially adjacent sprockets that a radially inner edge of the longitudinal end regions of the inner plates and/or outer plates is located nearer the sprocket rotation axis than a radially outer edge of the connectors during a meshing engagement of the bicycle chain with the smaller of the two axially adjacent sprockets.

For the most precise possible axial guiding of the bicycle chain at least at the sprocket having the smallest diameter substantially through the intermediate tooth space regions of the sprocket with the smallest possible axial movement play of the bicycle chain on the sprocket, it is advantageous, at least for the sprocket having the smallest diameter, if it is the case that the axial width of a roller support face of the sprocket, which support face is constructed for abutting engagement with a roller of the bicycle chain in the region of an intermediate tooth space, deviates by no more than 10% from the axial dimension of an outer roller face—in relation to the axial dimension of the outer roller face— constructed for abutment with the roller support face. The better the axial dimensions of the roller support face of the sprocket and the outer roller face adjoining it correspond, the more precisely the bicycle chain can be guided on the sprocket. In an embodiment, the axial width of the roller support face deviates by no more than 5%. In an embodiment, the axial width of the roller support face deviates by no more than 3% from the axial dimension of the outer roller face.

During a meshing engagement with the at least one sprocket, in particular the sprocket having the smallest diameter, an inner plate pair generally has an internal inner plate which is located axially nearer the axial end of the sprocket arrangement with the sprocket having the largest diameter and has an external inner plate which is located axially nearer the axial end of the sprocket arrangement with the sprocket having the smallest diameter. Longitudinal center portions of the internal and external inner plate of the inner plate pair are then located in the longitudinal chain direction between two rollers which are directly connected to that inner plate pair, wherein an introduction portion of a tooth is introduced between the longitudinal center portions and is withdrawn again during a torque transmission from the bicycle chain to the sprocket which meshes therewith.

In order to prevent undesirable friction between the introduction portion of a tooth and the bicycle chain, in particular in the region of the axially nearer internal plates of the inner plate pairs, it may be envisaged that it is the case for at least one tooth, for a plurality of teeth, and/or for all the teeth at least of the sprocket having the smallest diameter, that the axial width of the introduction portion of the at least one tooth is smaller than a clear axial width of the longitudinal center portions of the external and internal inner plates from each other so that, during the torque transmission, the end face directed away from the sprocket having the largest diameter in respect of the introduction portion which is introduced between the longitudinal center portions is arranged to be separated by an axial gap from the longitudinal center portion of the external inner plate of the inner plate pair, which inner plate is axially opposite it.

In order to ensure that at least the sprocket having the smallest diameter axially guides the bicycle chain which meshes with the respective sprocket only in the peripheral portions between directly successive teeth (intermediate tooth spaces), and in order to further prevent undesirable friction and therefore power losses during riding of the bicycle, the axial sprocket width in the region of the tooth base may be smaller radially inside the introduction portion than the clear axial width between the edges of the parallel inner plates of each inner plate pair in the longitudinal center portion(s), which edges face the sprocket rotation axis, so that an edge of the longitudinal center portion of the external inner plate, which edge faces the sprocket rotation axis, is also arranged to be separated during the torque transmission by a gap from a tooth base of an introduction portion which is introduced between them.

In order to achieve the advantageous effects in conjunction with the sprocket having the smallest diameter, the important aspect is not the use of the previously described sprocket having the largest diameter and the implementation of the values of the gear range packing coefficient described in the introduction so that an embodiment of the present invention relates to a bicycle rear wheel drive arrangement having a bicycle rear wheel sprocket arrangement and having a bicycle chain, wherein the tooth ring at least of the sprocket having the smallest diameter of the bicycle rear wheel sprocket arrangement is constructed so as to have an axial sprocket thickness which changes, in particular which changes periodically, over a periphery in a peripheral direction between teeth and intermediate tooth spaces which are directly adjacent thereto, wherein the axial thickness of the sprocket is greater in the region of the intermediate tooth spaces than in the region of the teeth.

An embodiment of the present invention further relates to a bicycle drive arrangement having a bicycle rear wheel sprocket arrangement or a bicycle rear wheel drive arrangement, in particular having a rear wheel sprocket arrangement, as described above and/or having a rear wheel sprocket arrangement as described above and having precisely one front chain ring which is nearer the pedal crank, wherein the chain ring has a technically effective number of teeth between 30 and 40, preferably between 34 and 36, with the limits mentioned being included. The "effective" number of teeth is the number of teeth of the chain ring itself in the case of a chain ring connected directly to the pedal cranks. If, however, the chain ring is connected to the pedal cranks via a gear arrangement, for example, a planet gear, the effective number of teeth of the chain ring results from the actual number of teeth of the chain ring taking into consideration the transmission ratio of the gear arrangement provided in the force path between the pedal cranks and tooth ring of the chain ring. The effective number of teeth of a chain ring which is connected to the pedal cranks by a gear arrangement is the number of teeth which a chain ring which is connected directly—therefore, without a gear arrangement being interposed—to the pedal cranks and which brings about an identical torque transmission from the pedal cranks to the same rear wheel sprocket would have.

With the rear wheel sprocket arrangement, that is to say, with the number of sprockets present therein and the respective number of teeth thereof, objective technical circumstances are provided for travel operation in the most optimized manner possible, such as, for example, the possible transmission bandwidth and the graduation of the individual adjustable transmission ratios.

However, the physical/individual characteristics of the individual cyclist are extremely different. Even cyclists with substantially the same pedal power can produce different pedal frequencies and different pedal forces while they output the same pedal power.

The individualized adaptation of the objective technical transmission circumstances provided by the rear wheel sprocket arrangement is consequently carried out advantageously by associating a chain ring taking into consideration the physical preferences of the respective cyclist with the rear wheel sprocket arrangement. For the above-described rear wheel sprocket arrangement, consequently, a chain ring having a technically effective number of teeth between 30 and 40 forms a large number of individual preferences of different cyclists, such as, for example, pedal frequencies and the like. Consequently, a bicycle can very readily be constructed by provision with the rear wheel sprocket arrangement in principle for a specific bandwidth of transmission ratios and a similarly determined graduation therebetween and individualized by the selection only of the suitable chain ring for the respective type of rider.

In comparison with the currently leading 1-fold chain switching system "XX1", for example, the rear wheel sprocket having the largest diameter of the sprocket arrangement may have eight more teeth and the chain ring may have at least four more teeth. Consequently, not only an even smaller transmission ratio is achieved between the pedal crank and rear wheel, but furthermore the maximum occurring tensile loading of the bicycle chain can be substantially reduced with the drive power otherwise being the same by using sprockets and chain rings which generally have larger diameters.

Furthermore, in the case of an unchanged sprocket having the smallest diameter, an even greater—in comparison with the prior art—maximum transmission ratio can also be adjusted as a result of the above-mentioned increase of the number of teeth of the chain ring with respect to the prior art ("XX1").

Another embodiment of the invention relates to a drive arrangement for a bicycle with such a rear wheel sprocket.

The drive arrangement comprises a bicycle chain, a front sprocket which is rotatable about a sprocket axis and has a multiplicity of teeth, which are constructed for positive-locking engagement with the bicycle chain, a derailleur and a bicycle rear wheel sprocket arrangement. The rear wheel sprocket arrangement is rotatable about a sprocket rotation axis and has a plurality of sprockets which are coaxial with respect to the sprocket rotation axis, are arranged with axial spacing from each other and have different numbers of teeth which are constructed for positive-locking engagement with the bicycle chain. The sprocket arrangement has a gear range quotient which is formed by division of the number of teeth of the sprocket having the largest diameter by the number of teeth of the sprocket having the smallest diameter. The sprocket arrangement furthermore has a packing density quotient which is formed by division of the number of sprockets in the sprocket arrangement by the axial spacing (A), measured in millimeters, of the axially outermost sprockets from each other. The sprocket arrangement finally has a gear range packing coefficient, formed from the product of the gear range quotient and the packing density quotient, which may be greater than 1.25, greater than 1.3, greater than 1.35, or, in an embodiment greater than 1.4.

In an embodiment of the drive arrangement, the gear range quotient of the bicycle rear wheel sprocket arrangement has a value equal to 5.

The sprocket having the largest diameter of the bicycle rear wheel sprocket arrangement may not have fewer than 50 teeth.

Furthermore, in an embodiment, the sprocket having the smallest diameter of the bicycle rear wheel sprocket arrangement does not have more than 10 teeth.

Furthermore, in an embodiment, the bicycle rear wheel sprocket arrangement of the drive arrangement comprises precisely 12 sprockets.

A drive arrangement for a bicycle with a rear wheel sprocket arrangement designed in such a manner equally supplies a sufficiently broad and also sufficiently refined selection of transmission ratios. The cyclist can choose between a very large step-up and a very small step-up without great shift jumps having a negative influence on the shift behavior.

In an embodiment of the drive arrangement, the rear derailleur has the bicycle chain passing therethrough and is movable relative to the sprocket arrangement in the direction of the common sprocket axis of the sprocket arrangement in order for an active sprocket to be selected by said axial relative movement. The derailleur has a tensioning device with two chain-guiding rollers with chain-guiding roller axes which are substantially parallel both to each other and to the common sprocket axis, an attachment part which is positionally fixed with respect to the sprocket axis and has an upper joint head, and a movement part which is coupled in a relatively movable manner to the positionally fixed attachment part by a parallelogram four-bar linkage. The tensioning device is arranged on the movement part so as to be pivotable about a tensioning pivot axis, which differs from the chain-guiding roller axes and is parallel to the chain-guiding roller axes, and is pretensioned with a chain-tensioning torque acting about the tensioning pivot axis. The four link axes of the parallelogram four-bar linkage are oriented orthogonally to the common sprocket axis of the sprocket arrangement irrespective of the selected relative position of the derailleur relative to the sprocket arrangement. A constant first distance length of the sprocket-closer chain-guiding roller axis from the tensioning pivot axis is shorter in this case than a constant second distance length of the sprocket-further chain-guiding roller axis from the tensioning pivot axis.

In an embodiment, a first connecting plane which contains the sprocket-closer chain-guiding roller axis and the tensioning pivot axis encloses an angle of 55° to 60° with a second connecting plane which contains the sprocket-further chain-guiding roller axis and the tensioning pivot axis.

In an embodiment, the second distance length of the sprocket-further chain-guiding roller axis from the tensioning pivot axis is less than 2.3 times, but more than 1.8 times the first distance length of the sprocket-closer chain-guiding roller axis from the tensioning pivot axis.

In an embodiment, the second distance length of the sprocket-further chain-guiding roller axis from the tensioning pivot axis is 2.15 times the first distance length of the sprocket-closer chain-guiding roller axis from the tensioning pivot axis. A derailleur designed in such a manner is optimally adapted to the rear wheel sprocket arrangement and provides a sufficient movement path. Specifically the length ratios (ratio of the first to the second length distance H) of the tensioning device ensure that the correct chain tension is ensured even at the largest sprocket having 50 teeth. The derailleur carries out an axial and radial relative movement in relation to the sprocket arrangement, which relative movement safely approaches all of the sprockets of the sprocket arrangement equally.

In an embodiment, the drive arrangement has precisely one front sprocket. With this arrangement, the shifting, which still remains problematic, at the front chain ring is avoided and, nevertheless, a sufficiently broad and precise selection of transmission ratios is provided because of the rear wheel sprocket arrangement.

The precisely one front sprocket has a first group of teeth and a second group of teeth. The first group of teeth can be designed here to be thicker in the axial direction and/or longer in the radial direction than the second group of teeth. The thicker and/or longer teeth of the first group can be arranged in an alternating manner with the thin and/or shorter teeth of the second group. A sprocket with an even overall number of teeth is ideal for this purpose. It is advantageous in this configuration that the chain is readily guided on the front sprocket by the differently designed teeth and jumping off of the chain is avoided.

An embodiment relates to a setting aid apparatus or device for a drive arrangement, in particular for the above-described drive arrangement.

The setting aid is suitable for setting a predetermined, drive-arrangement-specific distance between an upper or sprocket-closer chain-guiding roller of a rear derailleur and a largest sprocket of a bicycle rear wheel sprocket arrangement of a drive arrangement for a bicycle. The setting aid has a first marking for applying to an outer circumference of the upper chain-guiding roller, and a second marking for applying to an outer circumference of the largest sprocket of a bicycle rear wheel sprocket arrangement. The first marking is designed as a circular segment which corresponds to at least one part of the outer circumference of the upper chain-guiding roller.

The outer circumference of the chain-guiding roller or of the largest sprocket corresponds to its respective outside diameter. The markings are thus oriented to the outermost contour of the respective gearwheels and can be applied to the latter from the side.

The first marking of the setting aid may engage around the chain-guiding roller by at least 90 degrees in the circumferential direction in the applied state. That is to say, the first marking, which is designed as a circular segment, corresponds to at least 90 degrees or to a quarter of the outer circumference of the upper chain-guiding roller. This permits a neat application of the setting aid. Slipping is also avoided in particular if the first marking is designed as a protruding contact edge.

The second marking may likewise be designed as a circular segment. Owing to the second marking which is designed as a circular segment, the setting aid only has to be applied to the chain-guiding roller, but does not have to be positioned precisely in the circumferential direction. This facilitates the handling and ensures a certain clearance for the user, within which the setting aid can be oriented along the outer circumference of the chain-guiding roller.

The setting aid may have a further first marking and/or a further second marking. Said further markings permit the setting of a further drive arrangement at a further predetermined drive-arrangement-specific distance. The further drive arrangement is designed differently and accordingly requires a different predetermined distance. For example, the chain-guiding rollers can have 11 or 12 teeth, which results in an outer circumference of a different size and in a correspondingly different first marking. However, different sprocket arrangements can also be used with the same chain-guiding roller. As a result, the predetermined distance to be set likewise changes. However, the first marking for the chain-guiding roller can then furthermore be used in combination with a further second marking for the sprocket.

In an embodiment, the first and second marking, and also the further first marking and/or the further second marking are arranged on the same side of the setting aid. That is to say, all of the markings are arranged next to one another on the same front side or rear side. The user can then select an appropriate first and second marking in a manner corresponding to the drive arrangement. In order to facilitate the correct selection, the markings are advantageously labelled or identified in some other way.

Alternatively, the first marking and the second marking can be arranged on the front side of the setting aid and the further first marking and/or the further second marking can be arranged on the rear side of the setting aid. Such an arrangement ensures that the user does not make an erroneous selection from the markings. Either the front side or rear side of the setting aid is used, depending on the drive arrangement.

For both variants, it is advantageous that different drive arrangements can be set with just one setting aid.

In an embodiment, the markings are designed as a line, notch, contact edge or a combination thereof. The various embodiments have different advantages. A line is simple to manufacture because it can be printed onto the device, for example. Markings manufactured as contact edges have the advantage that the setting aid with its marking can be brought to a stop against the chain-guiding roller or the sprocket. However, the manufacture of a contact edge is more complicated.

The setting aid can be a template, the outer shape of which is not defined. The size and shape of the template merely have to be dimensioned such that the predetermined distance to be set can be indicated with reference to the first and second marking. In an embodiment, the setting aid also has a handle piece in addition to the markings for better handling.

In addition to the shape, the material of the template is also freely selectable. In addition to a setting aid manufactured from metal or plastic templates, templates printed on paper are also appropriate. Templates printed on paper can be produced particularly cost-effectively. Depending on requirements, the markings can be adapted and printed without an (injection molding) die having to be adapted for this purpose. By contrast, injection molding parts manufactured from plastic are more stable and more comfortable to handle. Markings manufactured specifically as notches or contact edges facilitate the handling of the setting aid. A setting aid, the first and second marking of which are manufactured as a contact edge, is particularly convenient. This makes it possible for the user to bring the first marking up to a stop against the outer circumference of the chain-guiding roller and then to adjust the distance by use of the set screw until the next closest tooth of the largest sprocket strikes against the contact edge of the second marking.

Figure 2:
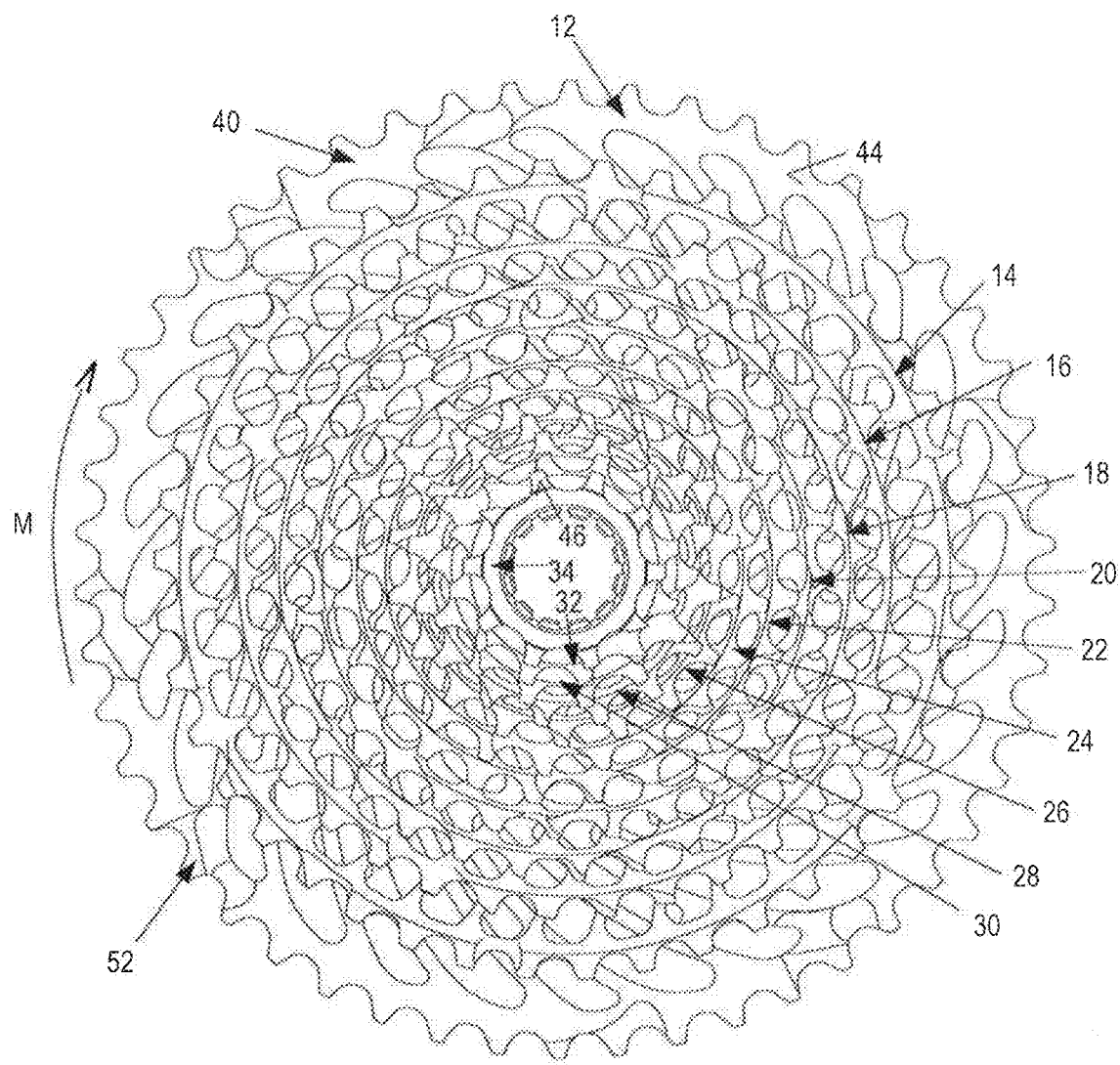
FIG. 2 is an axial front view of the sprocket arrangement of FIG. 1.
Figure 3:
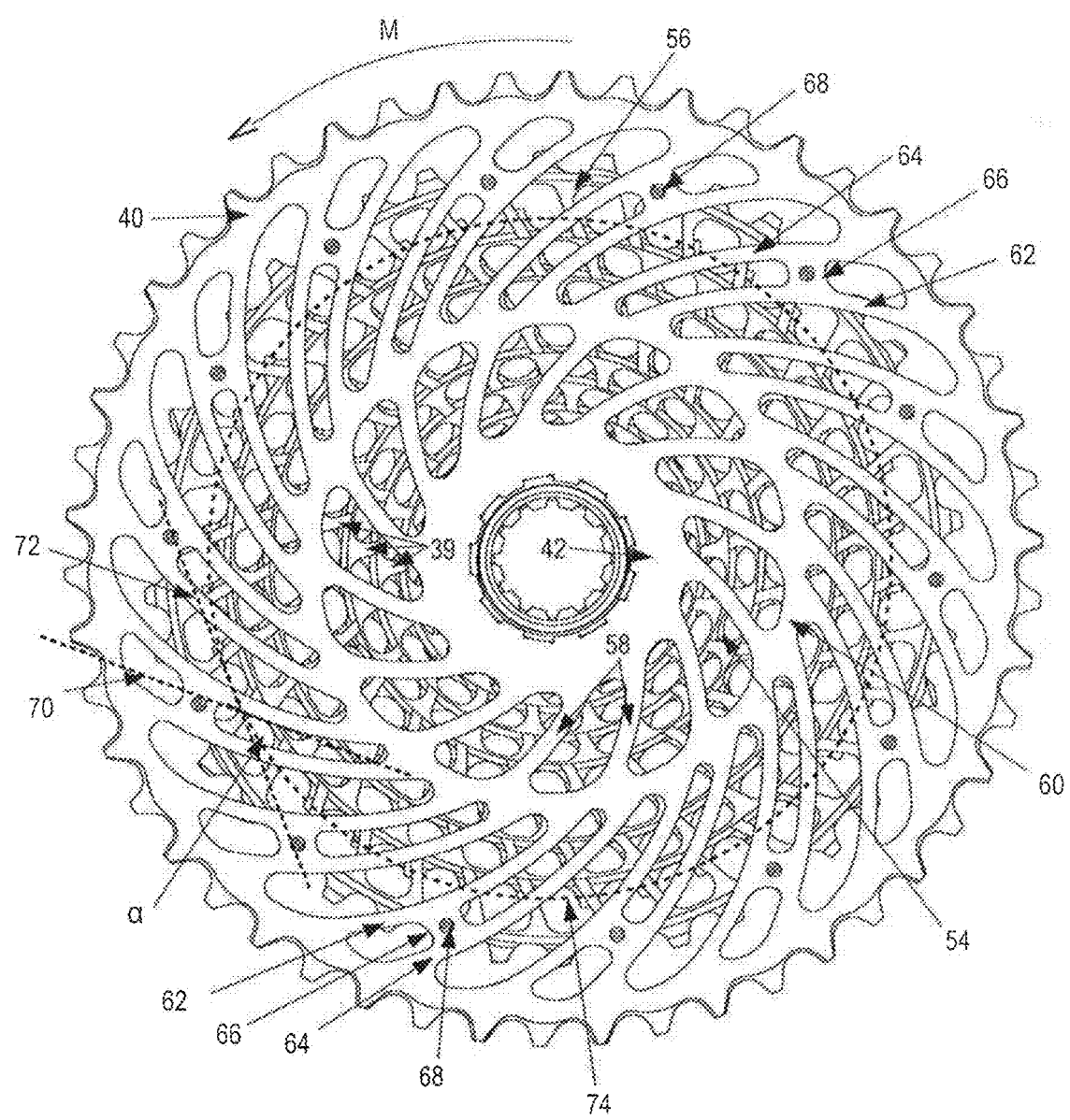
FIG. 3 is an axial rear view of the sprocket arrangement of FIGS. 1 and 2.

In FIGS. 1 to 3, an embodiment according to the invention of a bicycle rear wheel sprocket arrangement is generally designated 10. The sprocket arrangement 10 has in the example illustrated 12 sprockets which are designated 12 to 34. The sprocket having the largest diameter in this instance has the reference numeral 12, the next-smallest sprockets which follow in the direction of the sprocket axis R have the reference numerals 14 to 34, wherein the sprocket having the smallest diameter of the sprocket arrangement 10 is designated 34.

In this embodiment, the sprockets 14 to 34 are constructed as a sprocket dome 36 in a materially coherent, integral manner. The sprocket dome 36 is supported on a dome carrier 38 which can be connected to a bicycle hub which is not illustrated. Only the sprocket 12 having the greatest diameter is constructed separately from the remaining eleven ("11") sprockets 14 to 34.

The sprocket 34 having the smallest diameter has ten ("10") teeth, and the sprocket 12 having the largest diameter has 50 teeth. From the sprocket 34 having the smallest diameter to the sprocket 12 having the largest diameter, the sprockets of the sprocket arrangement 10 have the following numbers of teeth: 10-12-14-16-18-21-24-28-32-36-42-50. Consequently, the largest percentage increase in the number of teeth occurs from the smallest sprocket 34 to the next largest sprocket 32. That increase in the number of teeth is 20% in relation to the number of teeth of the sprocket 34 having the smallest diameter. All the remaining increases in the number of teeth from one sprocket to the next-largest sprocket are smaller than 20% in percentage terms. A fine graduation of the transmission ratios which can be provided with the sprocket arrangement 10 is thereby achieved.

The gear range quotient of the sprocket arrangement 10 is consequently 50:10=5.

The integral construction of the sprocket dome 36 will be explained by way of example below with reference to the axially directly adjacent sprockets 24 and 26:

An axial gap 37 which is bridged by a web 39 is provided between the sprockets 24 and 26. The web 39 is integrally constructed both with the sprocket 24 and with the sprocket 26. The web 39 may be constructed, for example, by material regions which were originally located before and after the web in a peripheral direction being removed, for example, by milling, so as to leave the web.

As can be seen in particular in the example of the sprocket 26, in which the plane of section of FIG. 1 cuts through a tooth, the web 39—as are advantageously also all the remaining webs 39 of the sprocket dome 36—is connected at a peripheral position to the smaller sprocket 26, at which a tooth is also constructed. This allows a construction of the web 39 in the position radially as far outwards as possible, which generally increases the rigidity of the sprocket dome 36. All the sprockets 14 to 34, which are integrally coherent in the same manner, of the sprocket dome 36 have a solid tooth ring 35, on which the teeth of the respective sprocket and the webs 39 are constructed.

As is typical for sprockets, the sprocket 12 having the largest diameter also has in a radially outermost position a tooth ring 40 which may be solid in a peripheral direction and, in a radially innermost position, a hub region 42 which may also be solid in a peripheral direction. The tooth ring 40 is constructed to move into meshing engagement with a bicycle chain in a manner known per se in order to transmit torque by using the bicycle chain (not shown in FIGS. 1 to 3) from the pedal cranks (also not illustrated) of a bicycle to the sprocket arrangement 10.

The hub region 42 is used to transmit torque from the sprocket arrangement 10 to the rear wheel hub which is not illustrated in the Figures and therefore to the rear running wheel of the bicycle which is not illustrated.

Figure 7:
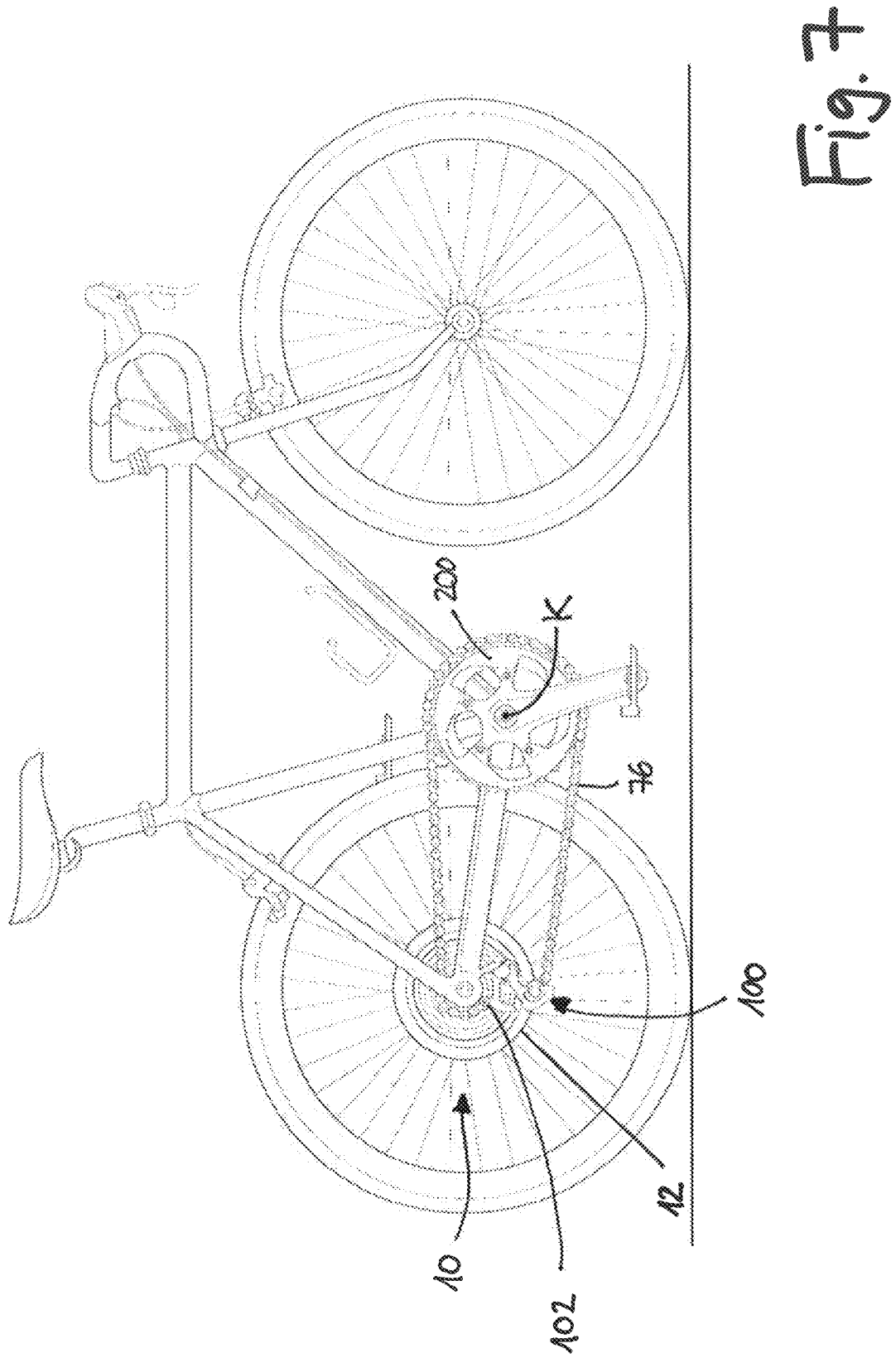
FIG. 7 is a bicycle with a drive arrangement.
Figure 8:
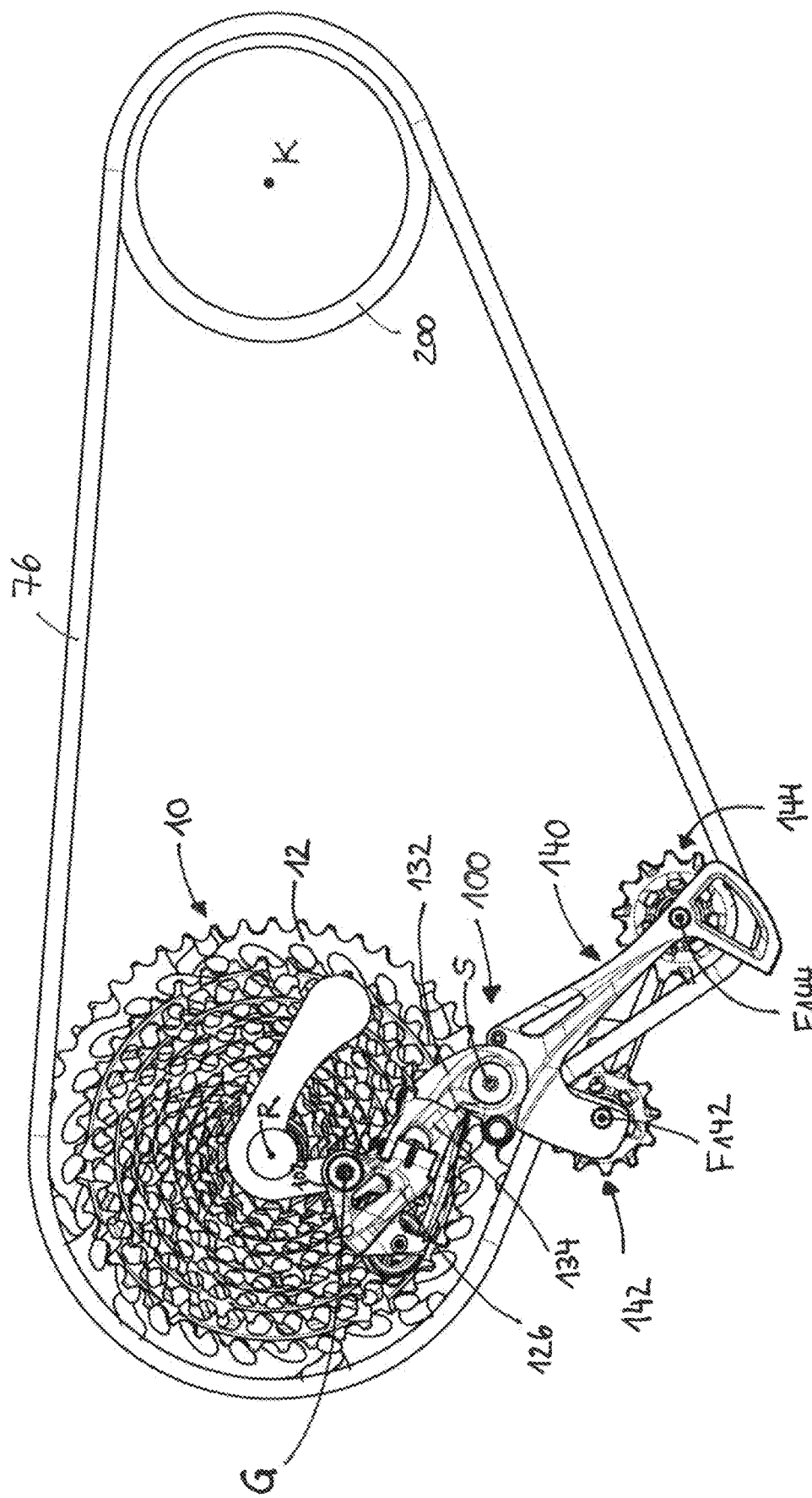
FIG. 8 is a side view of the drive arrangement.
Figure 9:
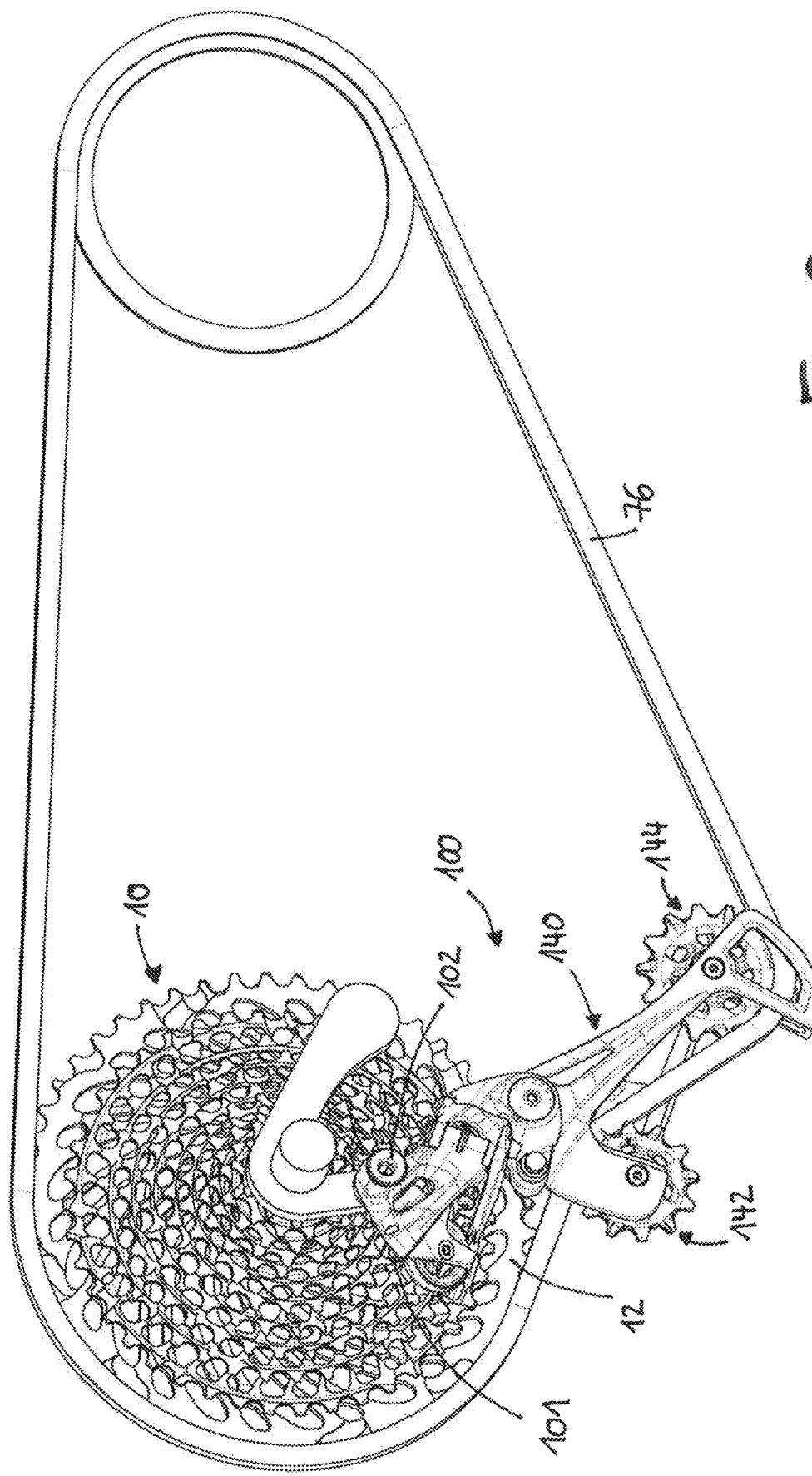
FIG. 9 is a perspective view of the drive arrangement.
Figure 10D:
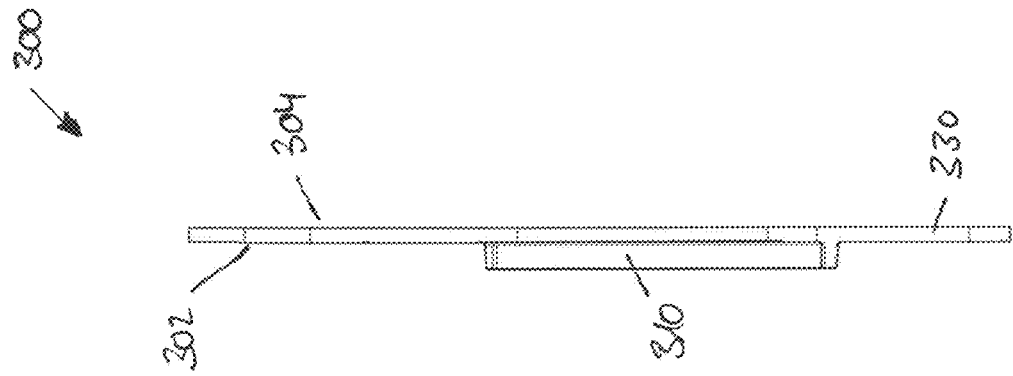
Figure 10C:
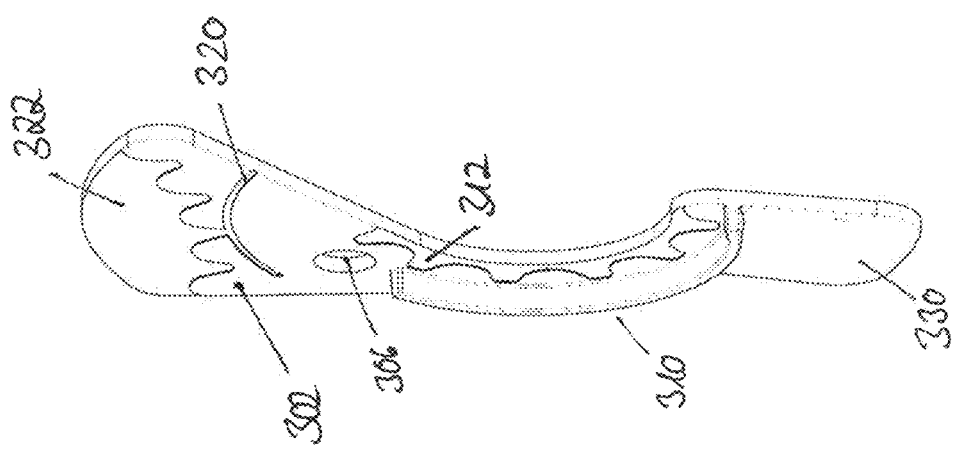
Figure 10B:
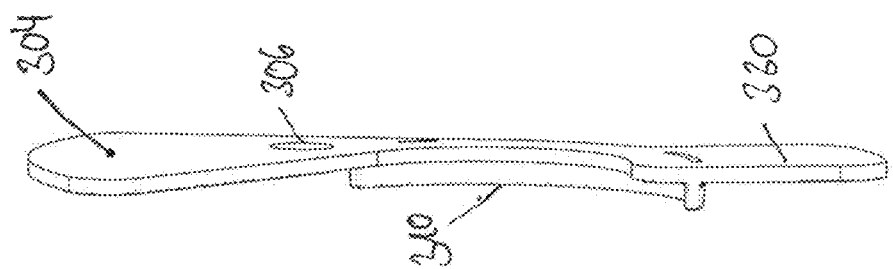

In order to change the sprocket which meshes with the bicycle chain which is not illustrated, the sprocket arrangement 10 cooperates in a manner known per se with a derailleur, for example as illustrated in FIGS. 7-9. The derailleur is moved in this instance with a travel path which has an axial component in the direction of the sprocket rotation axis R, beyond the axial extent range of the sprocket arrangement 10. The axial positions of the derailleur relative to the sprocket arrangement 10, at which the derailleur remains near the chain-guiding sprocket, are orientated towards the so-called "front faces" of the sprockets. In the present example, the front faces are orientated orthogonally relative to the sprocket rotation axis R wherein the radially outermost front face is intended to be used on each sprocket. In this instance, the front face is the radially outermost front face portion of a sprocket, which portion is orthogonal to the sprocket rotation axis R and is located at the front side directed towards the next-smallest sprocket or, in the case of the sprocket 34 having the smallest diameter, at the front side directed away from the sprocket 12 having the largest diameter.

In the case of the sprocket 12 having the largest diameter, the front face 44 is constructed at the front side of the tooth ring 40 directed towards the sprocket 34 having the smallest diameter. In the case of the sprocket 34 having the smallest diameter, the front face 46 thereof is constructed at the tooth flanks at the front side of the sprocket 34 directed away from the sprocket 12 having the largest diameter.

The axial spacing A between the front faces 44 and 46 of the sprocket 12 having the largest diameter or the sprocket 34 having the smallest diameter is 40.5 millimeters in the example illustrated.

Therefore, the packing density quotient of the sprocket arrangement 10 is 12:40.5=0.296.

Therefore, the gear range packing coefficient of the sprocket arrangement 10 is 5×0.296=1.48.

With the sprocket arrangement 10, therefore, it is possible to manage with only a single chain ring on the pedal cranks even on a mountain bike which is constructed for very steep gradients. In this instance, a single chain ring having an effective number of teeth in the range from 30 to 40 teeth may be used. Consequently, a speed step-down is brought about from the chain ring to the sprocket 12 having the largest diameter and a speed step-up is brought about from the chain ring to the sprocket 34 having the smallest diameter. As a result of the laws of conservation of energy, torque is stepped up from the chain ring to the sprocket 12 having the largest diameter and is stepped down with respect to the sprocket 34 having the smallest diameter. The step-up and step-down may be referred to in the present application with the general term "transmission".

In order to be able to produce the above-mentioned spacing A between the front faces 44 and 46 in the region of the tooth rings of the sprockets 12 to 34 without a similarly large axial spacing having to be provided for the assembly of the sprocket arrangement 10 in the region of the rear wheel hub, that is to say, for instance at the hub region 42 of the sprocket 12, the sprocket 12 having the largest diameter in the example illustrated has an angled portion 47 substantially in the region of the radial center thereof (always measured from the sprocket rotation axis R). Therefore, a sprocket region of the sprocket 12 having the largest diameter, which region is located radially inside the angled portion 47, is nearer the sprocket 34 having the smallest diameter than a sprocket region of the sprocket 12 located radially outside the angled portion 47.

As can further be seen in FIG. 1, the sprocket 12 having the largest diameter is supported with the front face 44 thereof on axial projections 48 of the next-smallest sprocket 14 which is directly axially adjacent thereto. The axial projections 48 are constructed in the example illustrated in an integral materially cohesive manner with the sprocket 14. However, this does not have to be the case. In place of the integral axial projections 48, there may also be provided between the sprockets 12 and 14 axial spacers which are constructed separately from the sprockets 12 and 14 in order to bridge the axial gap 50 present between those sprockets.

FIG. 2 is a front view in a viewing direction along the sprocket rotation axis R towards the sprocket arrangement 10 of FIG. 1. Consequently, the view in FIG. 2 is towards the front faces 44 and 46 of the sprocket 12 having the largest diameter or the sprocket 34 having the smallest diameter and towards all the front faces of the remaining sprockets 14 to 32, but which are not indicated in greater detail in FIG. 2. FIG. 2 shows front-end indentations or recesses 52 in the front face 44 of the sprocket 12 having the largest diameter. Those recesses 52 act as an auxiliary switching means during switching from the sprocket 14 to the larger sprocket 12.

FIG. 3 is a rear view in a viewing direction opposite the viewing direction of FIG. 2. Therefore, FIG. 3 shows some details of the structural configuration of the sprocket 12 having the largest diameter, which details promote the construction of the sprocket arrangement 10 with the gear range packing coefficient demonstrated.

As FIG. 2 has already shown, the sprockets 14 to 34 of the sprocket dome 36 are produced using a skeleton construction, that is to say, with solid radially outer tooth rings, on which the teeth and intermediate tooth spaces are formed, and with the spoke-like webs 39 radially inside the tooth rings.

Thus, the sprocket 12 having the largest diameter is also formed radially externally between the solid tooth ring 40 and the similarly solid hub region 42 radially internally so as to have sprocket spokes in order to reduce the weight of the sprocket 12 having the largest diameter without substantial losses of rigidity.

In the present example, the sprocket 12 having the largest diameter has a radially internal spoke region 54 and a radially external spoke region 56. The radially internal spoke region 54 has a smaller number of sprocket spokes 58 than the radially external spoke region 56. The radially internal and the radially external spoke region 54 and 56 are delimited from each other by a solid intermediate ring region 60 which may be constructed in an annular manner around the sprocket rotation axis R. The construction of the intermediate ring region 60 allows the different number of sprocket spokes in the spoke regions 54 and 56.

As a comparison of FIGS. 1 and 3 with each other shows, the angled portion 47 is constructed in the solid intermediate ring region 60 so that the angled portion is completely constructed in a radial region of solid material. It is thereby possible for the sprocket spokes to be constructed at both sides of the angled portion 47 or at both sides of the intermediate ring region 60 as planar sprocket spokes, which is advantageous for the rigidity and dimensional stability thereof under load.

In order to differentiate them from the sprocket spokes 58 of the radially internal spoke region 54, the sprocket spokes of the radially external spoke region 56 are designated 62 and 64.

The drive rotation direction of the sprocket arrangement 10 and therefore of the sprocket 12 having the largest diameter is designated M in FIGS. 2 and 3.

In this instance, every second sprocket spoke 62 of the outer spoke region 56 is connected to the sprocket spoke 64 which leads it directly in a drive rotation direction M by a connection strut 66. The rigidity of the sprocket 12 having the largest diameter is increased by that connection strut 66 over-proportionally relative to the increase in weight connected therewith. Consequently, the sprocket spokes 62 are connection spokes in the sense of the above introduction to the description. In order to avoid an unnecessary weight increase, the sprocket spokes 64 are not connected with connection struts to the sprocket spokes 62 which lead them directly in the drive rotation direction M.

The connection struts 66 may be located on a circle whose center is the sprocket rotation axis R. The connection struts 66 are further located on the sprocket 12 in the radially outermost position but within the radial extent range of the axially directly adjacent, next-smallest sprocket 14. The next-smallest sprocket 14 and with it the sprocket dome 36 can thereby be or become mechanically connected at the connection struts 66 to the sprocket 12 having the largest diameter.

The axial projections 48 previously mentioned in connection with FIG. 1 may be supported with the end faces thereof directed away from the sprocket 14 on the sides of the connection struts 66 facing them. In a particularly advantageous manner, pins 68 which may be integrally formed with the axial projections 48 thereon extend through the connection struts 66 in the example illustrated. By use of those pins 68 acting as connectors, the sprocket 12 having the largest diameter is connected so as to transmit torque and axial force to the next-smallest sprocket 14 and therefore to the entire sprocket dome 36.

As can very clearly be seen in FIG. 3, all the sprocket spokes 58, 62 and 64 of the sprocket 12 having the largest diameter are constructed on that sprocket 12 in such a manner that the radially inner longitudinal ends thereof are leading with respect to the radially outer longitudinal ends of the same sprocket spoke in the drive rotation direction M. A preponderant pressure loading of the individual sprocket spokes 58, 62 and 64 is thereby achieved during a torque transmission from a bicycle chain to the rear wheel hub.

Not only do the radially inner longitudinal ends of a sprocket spoke lead the radially outer longitudinal end of the same spoke but in addition the sprocket spokes 58, 62 and 64 may be constructed not to be straight but instead curved. The curvature of the sprocket spokes 58, 62 and 64 is brought about in this instance about curvature axes which are parallel with the sprocket rotation axis R and which follow the curved sprocket spoke in a drive rotation direction M. Therefore, the sprocket spokes 58, 62 and 64 are curved in a concave manner when viewed in the drive rotation direction M and are curved in a convex manner when viewed counter to the drive rotation direction M. As a result of this curvature, in the event of a torque transmission from the tooth ring 40 to the hub region 42 and therefore to the rear wheel hub, there is achieved in the sprocket spokes 58, 62 and 64 a particularly advantageous stress loading which is primarily formed by pressure stresses. The pressure resistance of a sprocket spoke is many times greater than the tensile resistance or shearing resistance thereof.

Furthermore, the curvature mentioned causes the angle α, which a tangent 70 located in the sprocket plane of the sprocket 12 on a sprocket spoke 58, 62 or 64 encloses with a tangent 72 also located in the sprocket plane on a reference circle 74 with the sprocket rotation axis R as the center, to be increasingly great the smaller the radius of the reference circle is. In an embodiment, all the angles between spoke tangents and reference circle tangents are of the same size for one and the same reference circle at all the sprocket spokes cut by this reference circle. In principle, the angle condition described in this instance could also be complied with by sprocket spokes in the form of polygons. However, the above-described curved construction of the sprocket spokes may be in order to prevent stress peaks in corner regions or bent regions of sprocket spokes in the form of polygons.

Figure 4:
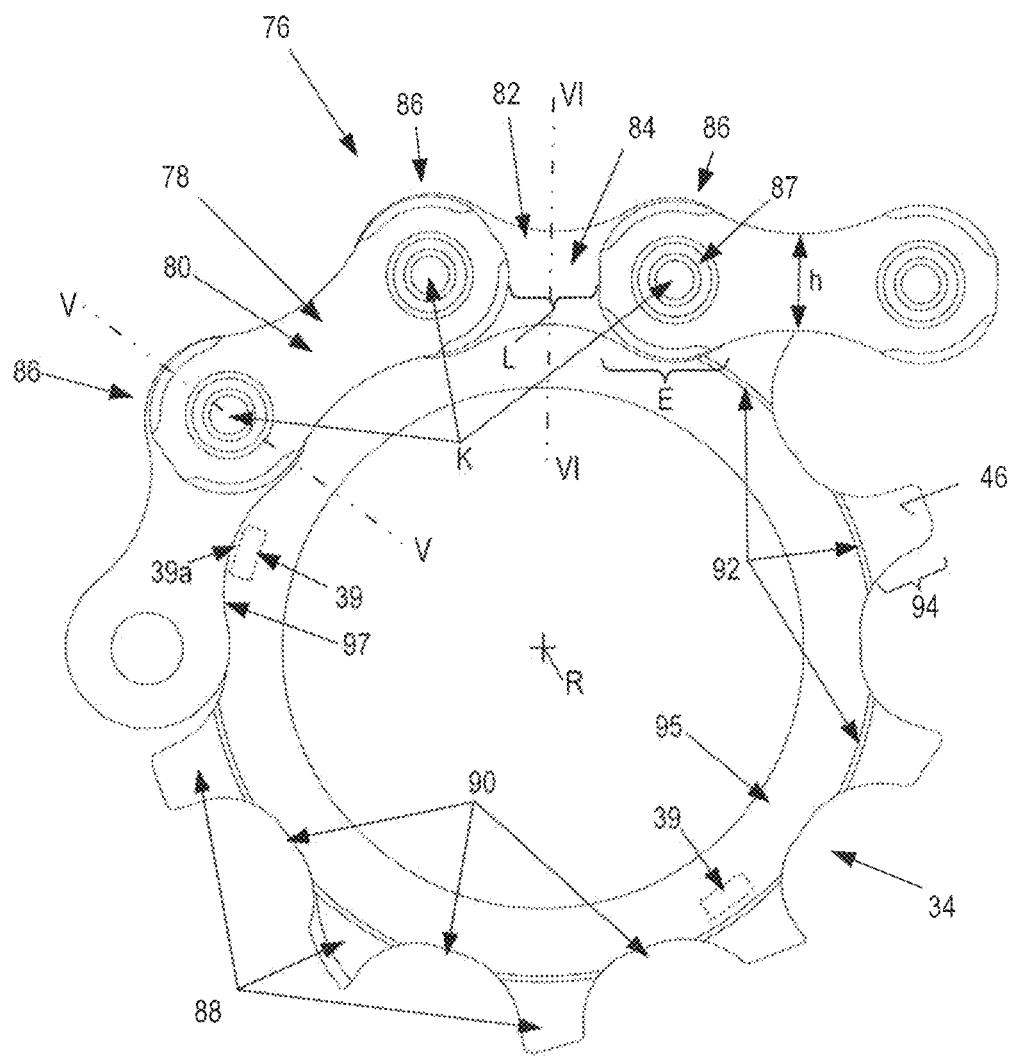
FIG. 4 is an axial view of the sprocket having the smallest diameter of the sprocket arrangement of FIGS. 1 to 3.

FIG. 4 is a front view of the sprocket 34 having the smallest diameter when viewed in an axial direction. Consequently, the sprocket rotation axis R is orthogonal to the plane of the drawing of FIG. 4 and the sprocket 12 which has the largest diameter and which is not illustrated in FIG. 4 and all the other sprockets 14 to 32 are behind the plane of the drawing of FIG. 4.

FIG. 4 illustrates a portion of a bicycle chain 76 which meshes with the sprocket 34 having the smallest diameter. The bicycle chain 76 has in a manner known per se pairs 78 of outer plates and pairs 82 of inner plates in an alternating manner over the course thereof. In FIG. 4, the viewer is looking towards the external outer plate 80, that is to say, the plate located further away from the sprocket 12 having the largest diameter. Similarly, the viewer is looking towards the external inner plate 84 in the inner plate pair 82. Furthermore, in a manner known per se, the outer plate pairs 78 and inner plate pairs 82 which are successive in an alternating manner in the longitudinal chain direction are connected to each other so as to be rotatable relative to each other about a chain link axis K. The chain link axes K of each connection between successive outer plate pairs 78 and inner plate pairs 82 are ideally parallel with the sprocket rotation axis R during meshing engagement with the sprocket 34. Furthermore, the chain link axes K are rotation axes of rollers 86 which are received between the respective plate pairs 78 and 82. However, the rollers 86 are hidden in FIG. 4 by the outer plates 80 and 84, respectively, and can be seen only in FIGS. 5 and 6.

Sprocket teeth 88 which are arranged so as to be distributed equidistantly at the periphery of the sprocket 34 engage in the intermediate spaces between two rollers 86 which are successive in the longitudinal chain direction in order to transmit torque between the bicycle chain 76 and the rear running wheel. In this instance, the rollers 86 are positioned on the sprocket 34 in the region of the intermediate tooth spaces 90 between teeth 88 which are directly successive in a peripheral direction.

Of the teeth 88, only an introduction portion 94 is introduced, during meshing engagement with the bicycle chain 76, into the intermediate space between two plates of one and the same plate pair and is withdrawn therefrom again. As will be further illustrated in detail in connection with the following FIGS. 5 and 6, the introduction portion 94 is constructed to be less wide in an axial direction than a support portion 95 of the sprocket 34 located radially inside the introduction portions. At the transition between the axially thicker support portion 95 and the axially thinner introduction portion 94, there is located an axial step 92 which further indicates the position of the respective tooth base. The axial step 92 may be constructed as a chamfer which is inclined in an axial direction away from the sprocket 12 having the largest diameter towards the sprocket rotation axis R.

FIG. 4 indicates on the inner plate pair 82 a longitudinal center portion L of the inner plate pair 82 and therefore of the external inner plate 84 and the internal inner plate opposite it in an axial direction.

The plates of the inner plate pairs 82 and the outer plate pairs 78 have a smaller plate height h in the longitudinal center portion L than in the longitudinal end regions E. Consequently, a web 39 for connection to the next-largest sprocket 32 (indicated by the broken-line rectangle 39 in FIG. 4) at the peripheral location of a tooth 88 may be provided in such a radially outer position that the radially outer edge 39a thereof is further away from the sprocket rotation axis R than an edge 97 of a plate in the region of the longitudinal end regions E thereof, which edge 97 faces the sprocket rotation axis R.

Figure 5:
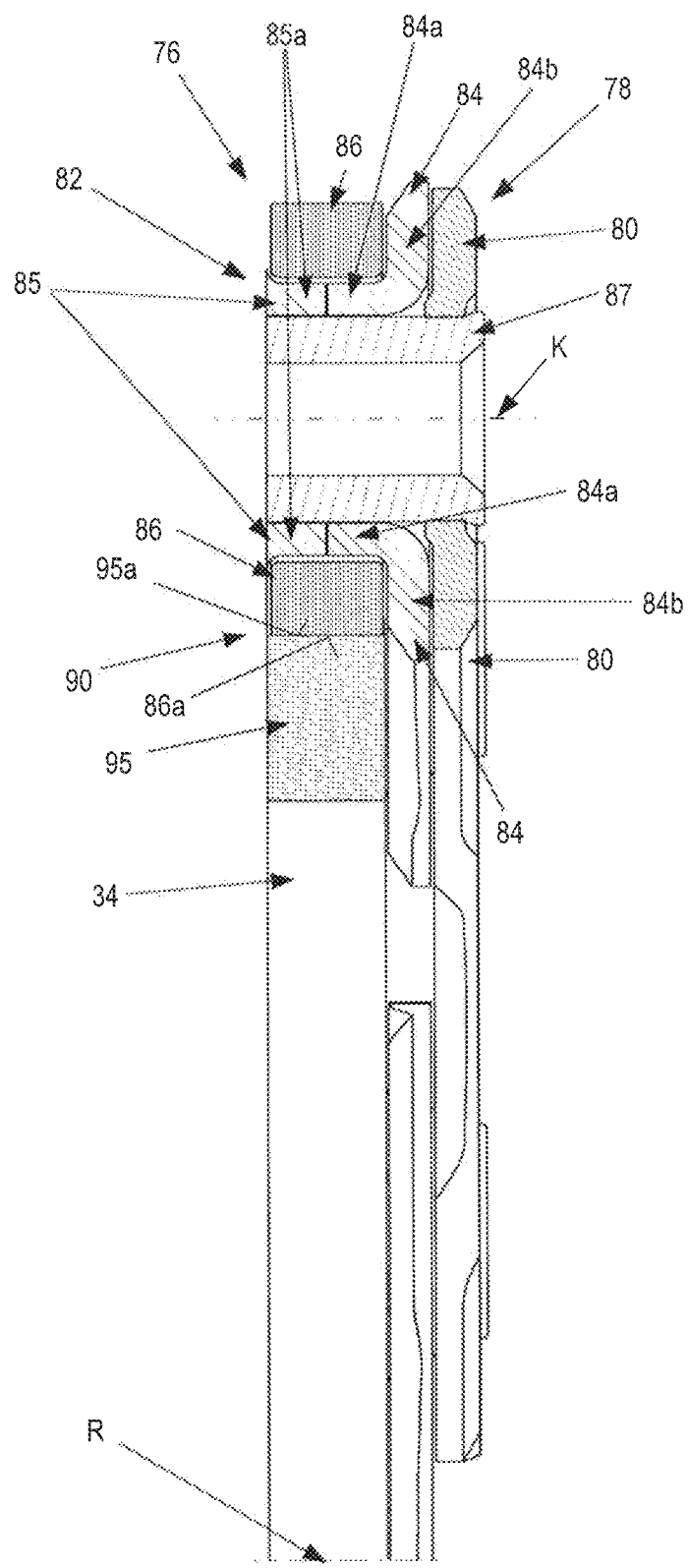
FIG. 5 is a longitudinal sectioned view through the sprocket having the smallest diameter of FIG. 4 along the plane of section V-V which contains the sprocket rotation axis.

FIG. 5 is a cross-section of the engagement situation of the sprocket 34 with the chain 76 in the plane of section V-V which contains the sprocket rotation axis R. The cross-section shown in FIG. 5 further extends through the chain link axis K and therefore through a roller 86 of the bicycle chain 76.

FIG. 5 shows how the support portion 95 of the sprocket 34 axially leads the bicycle chain 76 in the region of an intermediate tooth space 90 and consequently limits the axial movability thereof along the sprocket rotation axis R. In this instance, a roller 86 may be positioned with the outer face 86a thereof on a corresponding support face 95a of the support portion 95 directed in a radial direction, wherein the support portion 95, at least in the support region of the support face 95a thereof which is constructed for abutment of an outer roller face 86a, deviates from the axial width of the roller 86 which abuts it in the event of engagement in terms of the axial width thereof by no more than 10%, in another embodiment no more than 5%, and in another embodiment by no more than 3%. The axial width of the roller 86 is the reference variable for the percentage deviation.

The view of FIG. 5 shows a portion of an internal inner plate 85 which axially retains the roller 86 between the inner plate pair 82 together with the external inner plate 84. The chain link which is formed along the roller axis of the roller 86 which coincides with the chain link axis K comprises a chain rivet 87 which connects the plate pairs which meet each other at the chain link and which comprise the outer plate pair 78 and inner plate pair 82 to each other in an axial direction, but allows a relative rotation about the chain link axis K as the only relative movement.

The inner plates 84 and 85 each have in the longitudinal section of FIG. 5 an axial member 84a and 85a which is surrounded by the roller 86 and have a radial member 84b and 85b (not illustrated), between which the roller 86 is axially chamfered. Consequently, the radial members 84b and 85b of the inner plates 84 and 85 are opposite the front sides of the roller 86. It is the radial members 84b and 85b of the inner plates 84 and 85 which also bring about axial fixing of the bicycle chain 76 to the sprocket 34 in conjunction with the support portion 95. The radial members are discs and the axial members are sleeves in terms of the three-dimensional shape thereof.

Figure 6:
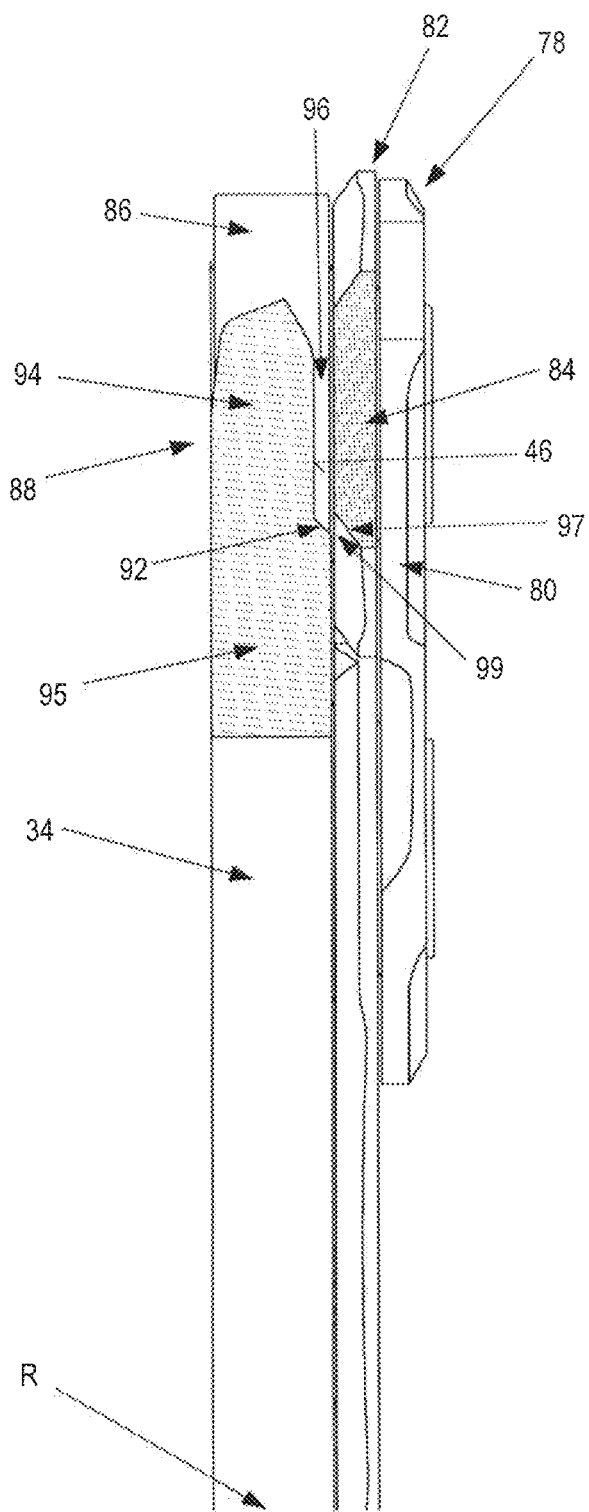
FIG. 6 is a longitudinal sectioned view through the sprocket having the smallest diameter of FIG. 4 along the plane of section VI-VI which contains the sprocket rotation axis.

FIG. 6 is a longitudinal section in the plane of section VI-VI which contains the sprocket rotation axis R. That plane of section intersects with the longitudinal center portion L of an inner plate pair 82 and intersects with the tooth 88 of the sprocket 34 introduced into that longitudinal center portion L.

The roller 86 shown in FIG. 6 adjoins the tooth which leads the cut tooth 88 of FIG. 6 and transmits torque thereto. A roller which adjoins the cut tooth 88 of FIG. 6 for the purpose of torque transmission is in front of the plane of the drawing of FIG. 6 and is therefore not illustrated.

As can be seen in FIG. 6, the axial width of the introduction portion 94 of the tooth 88 has smaller dimensions than the clear width of the longitudinal center portion L of the inner plate pair 82 so that the side of the introduction portion 94 having the front face 46—that is to say, the side directed away from the sprocket 12 having the largest diameter—is located with spacing from the external inner plate 84 of the inner plate pair 82 opposite it. Consequently, an axial gap 96 is provided between the introduction portion 94 and the external inner plate 84 axially opposite it. This axial gap 96 ensures the axial movability which the bicycle chain 76 requires in order to be switched to the next-largest sprocket. Therefore, a movability which is sufficient for switching is achieved in respect of the chain 76 in cooperation with the above-described, axial guiding of the bicycle chain 76 in the intermediate tooth spaces 90 without an undesirable rubbing contact of the chain 76 with the next-largest sprocket being produced as a result of excessively oblique running of the chain 76.

FIG. 6 further illustrates that an edge 97 of the external inner plate 84 directed towards the sprocket rotation axis R is arranged with spacing from the step 92 so that there is also a gap 99 between the step 92 and the edge 97 of the external inner plate 84 nearer the sprocket rotation axis R. Consequently, at least the external inner plate 84 of the inner plate pair 82 has no contact with the tooth 88 which engages between the inner plate pair 82. Consequently, the tooth 88 is advantageously used only or practically only for transmitting torque between the bicycle chain 76 and the sprocket 34, whereas the intermediate tooth spaces 90 can be used predominantly or even only for axially guiding the bicycle chain 76 on the sprocket 34.

As a result of this structural configuration, the bicycle chain 76 can be guided in an axially taut manner on the sprocket 34 so that the bicycle chain 76 does not touch the next-largest sprocket 32 which is axially directly adjacent to the sprocket 34 even in the presence of only a single chain ring at the pedal crank side and the associated oblique position. This is even more noteworthy since, in the twelve-fold sprocket arrangement 10 shown by way of example, the front face spacing between the sprockets 32 and 34 is very small and, for example, may be only approximately 3.6 mm.

FIG. 7 shows a bicycle which is equipped with a drive arrangement. For reasons of simplified illustration, the sprocket arrangement 10 and the derailleur 100 are only illustrated schematically. Nevertheless, it can be seen that the drive arrangement has a rear sprocket arrangement 10 with a very large largest sprocket 12. The jump between the largest sprocket 12 and the next smaller sprocket can clearly be seen. The chain 76 is in engagement with the teeth of the front sprocket 200 and with the teeth of a selected sprocket of the rear sprocket arrangement 10. The derailleur 200 is connected to the bicycle frame at the upper joint head 102 and ensures both the friction-free changing of the chain 76 between the sprockets of the sprocket arrangement 10 and the uniform tensioning of the chain 76 irrespective of the selected sprocket. The embodiment illustrated shows a drive with precisely one front sprocket 200 which rotates about the sprocket axis K. However, a plurality of front sprockets can also be combined with the sprocket arrangement. The directional details which now follow, such as "front/rear", "top/bottom" relate to the bicycle in the direction of travel.

FIG. 8 shows a side view of a drive arrangement with a sprocket 200 having a sprocket axis K, a rear sprocket arrangement 10, which rotates about a sprocket axis R, a chain 76 and a derailleur 100. The derailleur 100 is mounted on the bicycle frame at the upper joint head 102 so as to be pivotable about the joint head axis G. The derailleur 100 furthermore has a positionally fixed attachment part 126 which is connected to a movement part 132 via a parallelogram four-bar linkage 134. Owing to the parallelogram four-bar linkage 134, the movement part 132 can move relative to the attachment part 126. The relative movement primarily takes place in the axial direction, but also to a smaller extent in the radial direction (axially and radially relate to the sprocket arrangement 10) and makes it possible for the chain 76 to change from the largest sprocket 12 to the smallest sprocket. A tensioning device 140 is mounted on the movement part 132 so as to be pivotable about the tensioning pivot axis (S) and is pretensioned with a spring. The tensioning device 14 comprises an upper chain-guiding roller 142 with a rotation axis F142 and a lower chain-guiding roller 144 with a rotation axis F144. The chain 76 passes through the tensioning device 140 and is in engagement with the two guide rollers 142 and 144. The spring exerts a chain-tensioning torque on the tensioning device 140 in the clockwise direction about the tensioning pivot axis (S) such that the chain 76 is always tensioned, no matter with which of the sprockets of the sprocket arrangement 10 the chain 76 is in engagement.

The dimensions of the tensioning device 140 are coordinated precisely with the sprocket arrangement 10 and therefore ensure a friction-free adjustment of the chain 76 over and beyond all of the sprockets. Specifically the particularly large largest sprocket 12 requires an adaptation of the angles and lengths of the tensioning device 140. A constant first distance length is measured from the upper chain-guiding roller axis F142 to the tensioning pivot axis S. A constant second distance length is measured from the lower chain-guiding roller axis F144 to the tensioning pivot axis S. The second distance length is significantly larger here than the first distance length. The optimum ratio between the first and second distance length is important for a reliable shifting of all of the sprockets, particularly the largest sprocket 12. In the exemplary embodiment illustrated, the second distance length is 2.15 times the first distance length.

In FIG. 9, which shows a perspective view of the drive arrangement from FIG. 8, a set screw 101 (also B screw) can be seen. By use of said set screw 101, the derailleur 100 can be pivoted about the joint head axis G in relation to the bicycle frame. The pivoting changes the distance between the upper chain-guiding roller 142 and the sprockets of the sprocket arrangement 10. In the case illustrated, the chain is in engagement with the largest sprocket 12 of the sprocket arrangement 10, and therefore the free chain length or the distance between the largest sprocket 12 and the upper chain-guiding roller can also be readily seen.

FIGS. 10*a* to 10*d* show various views of a first embodiment of the setting aid 300. The template 300 has a first marking 310 for applying to the upper or sprocket-closer chain-guiding roller. The first marking 310 is designed as a protruding contact edge in the form of a circular segment. The template 300 can be guided laterally up to the chain-guiding roller, which is mounted on the bicycle, until the teeth of the chain-guiding roller lie against the contact edge 310. The indicated visualization 312 of the teeth of the chain-guiding roller permits intuitive handling of the template 300. The second marking 320 on the setting aid 300 defines and shows the correct distance between an upper chain-guiding roller and a sprocket arrangement. The second marking 320 is also designed as a circular segment, and therefore a constant distance is defined no matter in which position the setting aid 300 is along the circumference of the chain-guiding roller. For simplified handling, the outline 322 of a sprocket is likewise indicated. The visualization of the respective outlines 312 and 322 of the chain-guiding roller and of the sprocket can be printed on or impressed.

In this case, the second marking 320 is designed as a line. However, it could also be designed as a second protruding contact edge and could therefore act as a stop against the sprocket. The distance between guide roller and sprocket would then be reduced until the next closest tooth of the largest sprocket strikes against the second contact edge or marking. The first and the second marking can equally be configured as a line, impression, protruding edge or any desired combination. The length of the circular segment can vary here. Rectilinear markings are also possible, though less convenient.

For simpler handling of the setting aid 300, the latter furthermore has a handle piece 330. The latter is dimensioned in such a manner that the template 300 can be comfortably held between thumb and index finger. Furthermore, a mounting 306, designed as a simple hole in the template 300, permits simple storage, for example on a nail on the wall.

In the exemplary embodiment shown, the first and second marking 310, 320 and also the indicated outlines 312, 322 of the components are located on the front side 302 of the setting aid 300. As is visible in FIGS. 10 *b* and 10 *d*, the rear side 304 of the template 300 is flat.

The unused rear side of the setting aid could advantageously be used for further first and second markings for a differently dimensioned drive arrangement which accordingly requires a different predefined distance and markings. Thus, the front side of the template could be provided with a first marking for a derailleur with a chain-guiding roller having 12 teeth, and the rear side could be provided with a further first marking for a derailleur with a smaller chain-guiding roller having only 11 teeth. The second markings on the front and rear sides would also be adapted, depending on the drive arrangement, and would indicate differently predefined distances.

A plurality of first and/or second markings permit the use of the same setting aid for different drive systems. It is particularly advantageous since just a single template can be used for the settings of differently equipped bicycles.

The template 300 may be manufactured, for example through injection molding from a plastic. This leads to a stable template 300 which permits a relatively simple manufacturing of the markings 310, 320, 312 and 322 designed as elevations and impressions. In addition to plastic, other materials, such as metal or wood, would also be conceivable for the manufacturing of the template.

FIGS. 11 and 12 illustrate how the setting aid 300 is used. The drive arrangement shown comprises an individual front sprocket 200, illustrated schematically, a bicycle chain 76, illustrated schematically, a sprocket arrangement 10 (illustrated schematically in FIG. 11) with a plurality of sprockets, and a derailleur 100. The chain links (not illustrated here for simplicity reasons) of the chain 76 are in engagement with the teeth (likewise not illustrated here) of the sprocket 200 and of the sprocket arrangement 10 and transmit a force in the driving direction A. In order, during the shifting, to ensure as good a changing of the chain 76 between adjacent sprockets as possible, it is necessary to optimally set the drive arrangement. The correct distance between the upper chain-guiding roller 142 and the sprocket arrangement 10 is above all of importance here. This predefined distance defines how many free chain links, which are neither in engagement with the teeth of a sprocket nor with the teeth of the upper chain-guiding roller 142, of the chain 76 are located between the upper chain-guiding roller 142 and the sprocket arrangement 10. Depending on the drive arrangement, this distance differs depending, inter alia, on the derailleur geometry, and the number and size of the sprockets and chain rings. The predefined distance is intended to remain approximately the same during the shifting, i.e. during the changing of the chain 76 from one sprocket to the next. However, minor changes to the predetermined distance, depending on with which sprocket the chain 76 is in engagement, are normal and do not have a negative effect.

Specifically in the case of components which are retrofitted or interchanged, it is important that the setting of the drive arrangement can be carried out in a simple manner by the customer himself. For this purpose, the chain 76 is brought into engagement with the largest sprocket 12. The setting aid 300 is then applied with its first marking or the protruding contact edge 310 to the upper chain-guiding roller 142 of the derailleur 100. The setting aid can be held here at the handle piece 330. The contact edge 310 is designed as a circular segment which is open forward (directional details relate to the direction of travel of the bicycle) and corresponds to the outer circumference of the chain-guiding roller 142. Slipping of the applied template 300 is substantially avoided because of the circular segment. Through this orientation of the circular segment, the template 300 can be brought up from the rear to the derailleur 100 without colliding with the chain 76, the tensioning device 140 or other parts of the derailleur 100.

The distance between the upper chain-guiding roller 142 and the largest sprocket 12 can be increased or reduced by the set screw 101 (also called B screw) being tightened or loosened. The set screw 101 presses against a stop in the vicinity of the upper joint head 102, which leads to the entire derailleur 100 rotating about the axis G of the upper joint head 102. With the alignment or pivoting of the derailleur 100 about the axis G, the distance between the upper chain-guiding roller 142 and the outer edge of the largest sprocket 12 also changes. The distance is changed by rotation of the set screw 101 until the outer edge of the largest sprocket 12 (FIG. 11) or the tooth tip of the closest tooth to the largest sprocket 12 (FIG. 12) coincides with the second marking 320 or touches the latter.

A precise orientation of the template 300 in the circumferential direction of the chain-guiding roller 142 is not necessary because of the shaping of the second marking 320. The second marking 320 is a circular segment. Depending on the orientation of the template 300 along the outer circumference of the upper chain-guiding roller 142, the tip of the closest tooth of the largest sprocket 12 is displaced along the circular segment 320. The orientation of the tooth at the second marking 320 can be seen particularly readily in FIG. 12.

In other derailleur designs, a spring in the joint head can pretension the derailleur about the joint head axis. In this case, the spring strength is changed by use of the set screw and therefore the derailleur is oriented about the joint head axis and at the same time the distance is set.

The drive arrangement illustrated is merely one example for illustrating the use of the setting aid 300. The setting of the predefined distance between any desired upper chain-guiding roller and any desired sprocket assembly always proceeds in an identical manner. Only the predefined distance changes, depending on the drive arrangement. In the case of drive arrangements having a plurality of front chain rings, the setting may place when the chain is in engagement with the largest rear sprocket and the smallest front chain ring.

Figure 13:
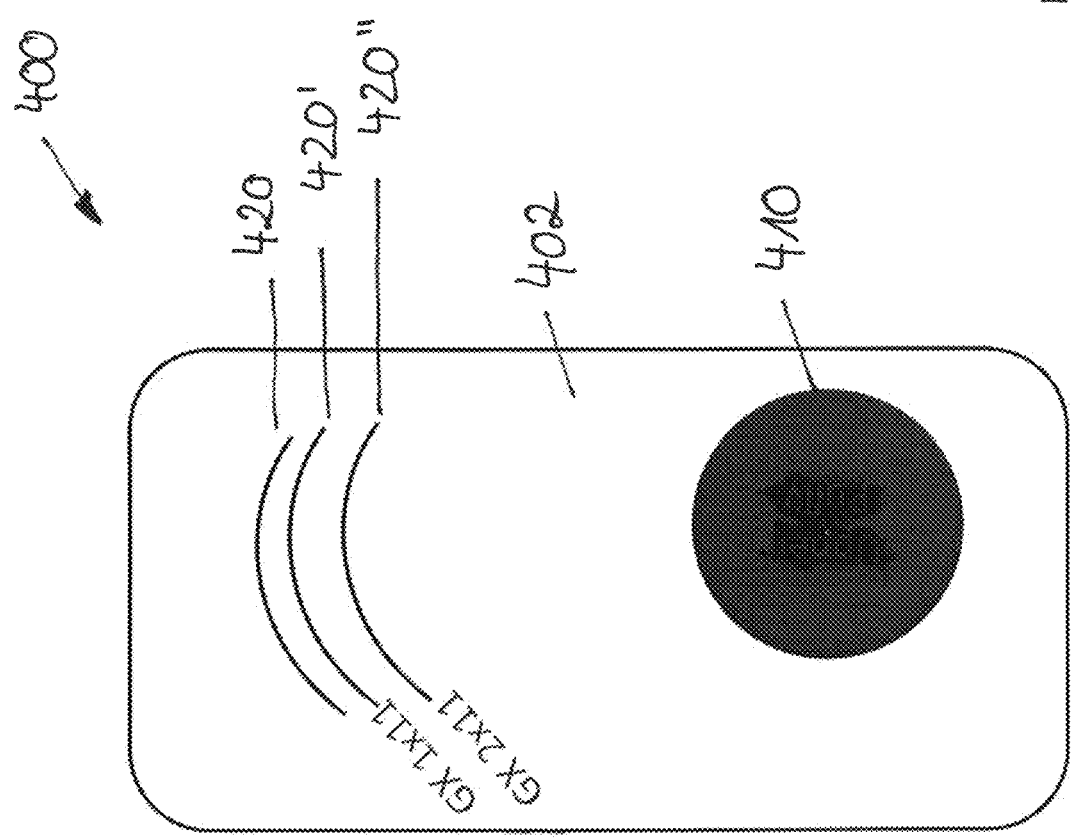
FIG. 13 is an additional embodiment of the setting aid.

FIG. 13 shows a further embodiment of the setting aid 400 with a first marking 410, a second marking 420 and two further second markings 420' and 420". This setting aid 400 can be used for setting a drive arrangement with a chain-guiding roller, the outer diameter or outer circumference of which corresponds to the diameter of the first marking 410, which is designed as a circle. The upper chain-guiding roller is brought to coincide with the first marking 410 of the template 400 and then one of the second markings 420, 420' or 420" is selected, depending on the drive arrangement. In the case shown, the template 400 is suitable for setting the one-fold derailleur drive arrangement GX 1×11 (420') and further additional chain ring drive arrangements such as the two chain ring GX 2×11 (420"). The predetermined distances to be set differ correspondingly. The labelling of the markings facilitates the correct selection.

In an embodiment such as that shown in FIG. 13, an extremely cost-effective alternative, which is simpler to produce compared to the previous example composed of plastic with protruding features. The first marking 410 for applying to the upper chain-guiding roller and the second marking 420 for applying to the lower edge of a sprocket of a multiple sprocket arrangement are formed here in printed form. The template can thus be printed cost-effectively onto a material, such as paper or cardboard, which is suitable for printing. A paper card, for example in visiting card format, which can be attached cost-effectively to the respective bicycle components or can be printed directly onto the packaging is also conceivable. The template can be cut out or held in position in its entirety. For the setting, the printed template is simply held behind the upper chain-guiding roller and aligned therewith, and the distance between the largest sprocket and the upper chain-guiding roller is subsequently then changed until the tip of the closest tooth of the sprocket (lower edge) is aligned with the second marking.

A plurality of different first markings and/or second markings permit the use of the setting aid for different derailleurs (first marking) and for different multiple sprocket arrangements (second marking). For example, there are differently sized chain-guiding rollers having a different number of teeth. The most common chain-guiding rollers have 11 or 12 teeth and accordingly diameters of differing size. It would be advantageous to print these two sizes, for example as circles or circular segments, on the template. To avoid confusion in the markings on one side of the template and in order to avoid a wrong selection, front and rear side can also be printed for different drive arrangements. A correct setting of the drive arrangement is possible for any amateur through use of the setting aid.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A drive arrangement for a bicycle, comprising
a chain;
a front sprocket which is rotatable about a sprocket axis and has a multiplicity of teeth which are constructed for engagement with the chain;
a rear wheel sprocket arrangement rotatable about a sprocket rotation axis and comprising a plurality of sprockets which are coaxial with respect to the sprocket rotation axis, the plurality of sprockets arranged with axial spacing from each other and having different numbers of teeth which are constructed for engagement with the chain, at least some of the plurality of sprockets constructed as a sprocket dome,
wherein the sprocket arrangement has a gear range quotient which is formed by division of the number of teeth of the sprocket having the largest diameter by the number of teeth of the sprocket having the smallest diameter, and has a packing density quotient which is formed by division of a number of sprockets in the sprocket arrangement by the axial spacing of axially outermost sprockets from each other measured in millimeters, and
wherein the sprocket arrangement has a gear range packing coefficient, formed from a product of the gear range quotient and the packing density quotient, is greater than 1.25, and at least a portion of the sprocket having the largest diameter overlaps at least the adjacent next smallest sprocket in the axial direction; and
a rear derailleur.

2. The drive arrangement of claim 1, wherein the sprocket arrangement has a gear range packing coefficient, formed from the product of the gear range quotient and the packing density quotient greater than 1.3.

3. The drive arrangement of claim 2, wherein the sprocket arrangement has a gear range packing coefficient, formed from the product of the gear range quotient and the packing density quotient greater than 1.35.

4. The drive arrangement of claim 3, wherein the sprocket arrangement has a gear range packing coefficient, formed from the product of the gear range quotient and the packing density quotient greater than 1.4.

5. The drive arrangement of claim 1, wherein the gear range quotient of the rear wheel sprocket arrangement has a value equal to five ("5").

6. The drive arrangement of claim 1, wherein the sprocket having the largest diameter of the rear wheel sprocket arrangement has at least fifty ("50") teeth.

7. The drive arrangement of claim 1, wherein the sprocket having the smallest diameter of the rear wheel sprocket arrangement has ten ("10") or fewer teeth.

8. The drive arrangement of claim 1, wherein the rear wheel sprocket arrangement comprises twelve ("12") sprockets.

9. The drive arrangement of claim 1, wherein the rear derailleur is configured for the chain to pass therethrough and is movable relative to the sprocket arrangement in a direction of the common sprocket axis of the sprocket arrangement in order for an active sprocket to be selected by said axial relative movement, wherein the derailleur comprises:
a tensioning device with two chain-guiding rollers with chain-guiding roller axes which are substantially parallel both to each other and to the common sprocket axis,
an attachment part which is positionally fixed with respect to the sprocket axis and has an upper joint head, and
a movement part which is coupled in a relatively movable manner to the positionally fixed attachment part by four-bar linkage forming a parallelogram,
wherein the tensioning device is arranged on the movement part so as to be pivotable about a tensioning pivot axis, which differs from the chain-guiding roller axes and is parallel to the chain-guiding roller axes, and is pretensioned with a chain-tensioning torque acting about the tensioning pivot axis,
wherein four link axes of the four-bar linkage are oriented orthogonally to the common sprocket axis of the sprocket arrangement irrespective of the selected relative position of the derailleur to the sprocket arrangement, and wherein a constant first distance length of a sprocket-nearer chain-guiding roller axis from the tensioning pivot axis is shorter than a constant second distance length of a sprocket-further chain-guiding roller axis from the tensioning pivot axis.

10. The drive arrangement of claim 9, wherein a first connecting plane which contains the sprocket-closer chain-guiding roller axis and the tensioning pivot axis encloses an angle of 55° to 60° with a second connecting plane which contains the sprocket-further chain-guiding roller axis and the tensioning pivot axis.

11. The drive arrangement of claim 10, wherein the second distance length of the sprocket-further chain-guiding roller axis from the tensioning pivot axis is less than 2.3 times, but more than 1.8 times, the first distance length of the sprocket-closer chain-guiding roller axis from the tensioning pivot axis.

12. The drive arrangement of claim 11, wherein the second distance length of the sprocket-further chain-guiding roller axis from the tensioning pivot axis is 2.15 times the first distance length of the sprocket-closer chain-guiding roller axis from the tensioning pivot axis.

13. The drive arrangement of claim 1, further comprised of precisely one front sprocket constructed for engagement with the chain.

14. The drive arrangement of claim 13, wherein the precisely one front sprocket has a first group of teeth and a second group of teeth.

15. The drive arrangement of claim 1, wherein the sprocket dome is constructed in a materially coherent, integral manner.

16. The drive arrangement of claim 1, wherein an axial gap between at least two of the sprockets of the sprocket dome is bridged by a web provided between the sprockets.

17. The drive arrangement of claim 16, wherein the web is integrally constructed with the at least two sprockets.

18. The drive arrangement of claim 16, wherein the at least two of the sprockets of the sprocket dome are adjacent sprockets.

19. The drive arrangement of claim 1, wherein the packing density quotient has a value from 0.290 to 0.33.

* * * * *